United States Patent
Ke

(10) Patent No.: US 12,538,124 B2
(45) Date of Patent: Jan. 27, 2026

(54) ACCESS CONTROL METHOD AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 442 days.

(21) Appl. No.: 17/947,713

(22) Filed: Sep. 19, 2022

(65) Prior Publication Data
US 2023/0017260 A1   Jan. 19, 2023

Related U.S. Application Data

(63) Continuation of application No. PCT/CN2021/081741, filed on Mar. 19, 2021.

(30) Foreign Application Priority Data

Mar. 20, 2020 (CN) .......................... 202010203175.8

(51) Int. Cl.
*H04W 12/06* (2021.01)
(52) U.S. Cl.
CPC .................. *H04W 12/06* (2013.01)
(58) Field of Classification Search
CPC ..................................................... H04W 12/06
USPC ........................................................... 726/6
See application file for complete search history.

(56) References Cited

U.S. PATENT DOCUMENTS

| | | | |
|---|---|---|---|
| 2005/0154895 A1 | 7/2005 | Zhang | |
| 2007/0248050 A1 | 10/2007 | Metke et al. | |
| 2011/0010764 A1 | 1/2011 | Lei et al. | |
| 2011/0047603 A1* | 2/2011 | Gordon | H04L 63/0823 726/5 |
| 2011/0252230 A1 | 10/2011 | Segre et al. | |

(Continued)

FOREIGN PATENT DOCUMENTS

| | | |
|---|---|---|
| CN | 101946455 A | 1/2011 |
| CN | 102215487 A | 10/2011 |

(Continued)

OTHER PUBLICATIONS

Extended European Search Report for Application No. 21770556.5 dated Aug. 25, 2023, 12 Pages.

(Continued)

*Primary Examiner* — Linglan Edwards
*Assistant Examiner* — Phuc Pham
(74) *Attorney, Agent, or Firm* — BROOKS KUSHMAN P.C.

(57) ABSTRACT

An access control method and a communications device are provided. The method includes: sending first information and/or first indication information to a first target end, where the first information includes at least one of the following: index information of a second authentication server, vendor-related information of the first communications device, and address-related information of the second authentication server; and the first indication information is used for requesting to obtain a credential related to a first network, or used to indicate that an access type is a restricted service.

19 Claims, 9 Drawing Sheets

(56) References Cited

U.S. PATENT DOCUMENTS

| | | | | |
|---|---|---|---|---|
| 2013/0305330 | A1* | 11/2013 | Palanigounder | H04W 12/04 726/6 |
| 2014/0068707 | A1 | 3/2014 | Sakura et al. | |
| 2016/0255554 | A1* | 9/2016 | Ke | H04W 36/08 455/436 |
| 2016/0261596 | A1 | 9/2016 | Khello et al. | |
| 2019/0347400 | A1* | 11/2019 | Myers | H04L 63/083 |
| 2024/0306083 | A1* | 9/2024 | Vangala | H04W 60/04 |

FOREIGN PATENT DOCUMENTS

| | | |
|---|---|---|
| CN | 104769909 A | 7/2015 |
| CN | 106465120 A | 2/2017 |
| EP | 3545700 A1 | 2/2019 |
| EP | 3562187 A1 | 10/2019 |
| JP | 2004235890 A | 8/2004 |
| JP | 2009031848 A | 2/2009 |

OTHER PUBLICATIONS

Huawei, HiSilicon "New Solution UE onboarding and provisioning for SNPN subscription" SA WG2 Meeting #136AH, Incheon, South Korea, Jan. 2020, S2-2000645, 8 Pages.

First Office Action for Japanese Application No. 2022-554249, dated Aug. 23, 2023, 6 Pages.

Vivo "Solution for UE onboarding and provisioning for SNPN access" SA WG2 Meeting #136AH, Incheon, Korea, Jan. 2020, S2-2000136, 2 Pages.

Nokia, Nokia Shanghai Bell "Solution for UE Onboarding and provisioning for an SNPN" SA WG2 Meeting #S2-136-AH, Incheon, KR, Jan. 2020, S2-2000667, 6 pages.

Apple "Solution of Key Issue #5: Support of Equivalent SNPN" SA WG2 Meeting #136-AH, Incheon, South Korea, Jan. 2020, S2-2000748, 8 Pages.

International Search Report and Written Opinion for Application No. PCT/CN2021/081741, dated Jun. 9, 2021, 8 pages.

* cited by examiner

ACCESS CONTROL METHOD AND COMMUNICATIONS DEVICE

CROSS-REFERENCE TO RELATED APPLICATIONS

This application is a continuation of PCT International Application No. PCT/CN2021/081741 filed on Mar. 19, 2021 which claims priority to Chinese Patent Application No. 202010203175.8 filed on Mar. 20, 2020, which are incorporated herein by reference in their entireties.

TECHNICAL FIELD

The present invention relates to the field of wireless communications technologies, and in particular, to an access control method and a communications device.

BACKGROUND

In some communication scenarios, there are scenarios in which communications devices with no network credential accesses a network. For example, a terminal being delivered from a factory still has no credential for a standalone non-public network (SNPN) and therefore cannot pass authentication by the SNPN. Before successful authentication by the network, it is currently impossible to obtain authentication-related information of the communications devices.

SUMMARY

Embodiments of the present invention provide an access control method and a communications device, so as to resolve the problem of failing to obtain authentication-related information of a communications device.

According to a first aspect, an embodiment of the present invention provides an access control method, applied to a first communications device and including:
sending first information and/or first indication information to a first target end, where the first information includes at least one of the following:
index information of a second authentication server;
vendor-related information of the first communications device; and
address-related information of the second authentication server.

The first indication information is used for requesting to obtain a credential related to a first network, or used to indicate that an access type is a restricted service.

According to a second aspect, an embodiment of the present invention provides an access control method, applied to a second communications device and including:
obtaining at least one of first information, first indication information, a legitimate device list, and third information; and
performing a first operation based on at least one of the first information, the first indication information, the legitimate device list, and the third information.

The first information includes at least one of the following: index information of a second authentication server, vendor-related information of a first communications device, and address-related information of the second authentication server.

The first indication information is used for requesting to obtain a credential related to a first network, or used to indicate that an access type is a restricted service.

The third information includes at least one of the following:
mapping information between the index information of the second authentication server and the address-related information of the second authentication server; and
the address-related information of the second authentication server.

According to a third aspect, an embodiment of the present invention provides an access control method, applied to a third communications device and including:
determining third information; and
sending the third information.

The third information includes at least one of the following:
mapping information between index information of a second authentication server and address-related information of the second authentication server; and
the address-related information of the second authentication server.

According to a fourth aspect, an embodiment of the present invention provides an access control method, applied to a fourth communications device and including:
obtaining second information; and
performing a second operation based on the second information.

The second information includes at least one of the following:
a first terminal routing policy;
default DNN information being left blank;
default slice information being left blank;
related information for establishing a first data channel;
second indication information;
third indication information;
address-related information of a first server; and
address-related information of a second authentication server.

The first server is a server capable of configuring a credential related to a first network.

The first terminal routing policy is used for accessing the first server or a credential download application.

The first data channel is a data channel in the first network.

The second indication information is used to indicate at least one of the following:
the first data channel is used for interaction between a first communications device and the first server;
the first data channel is used by the first communications device to request the credential related to the first network; and
the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

According to a fifth aspect, an embodiment of the present invention provides an access control method, applied to a fifth communications device and including:
sending second information, where the second information includes at least one of the following:
a first terminal routing policy;
default DNN information being left blank;
default slice information being left blank;
related information for establishing a first data channel;

second indication information;
third indication information;
address-related information of a first server; and
address-related information of a second authentication server.

The first server is a server capable of configuring a credential related to a first network.

The first terminal routing policy is used for accessing the first server or a credential download application.

The first data channel is a data channel in the first network.

The second indication information is used to indicate at least one of the following:
- the first data channel is used for interaction between a first communications device and the first server;
- the first data channel is used by the first communications device to request the credential related to the first network; and
- the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

According to a sixth aspect, an embodiment of the present invention provides a communications device, and the communications device is a first communications device, including:
- a first sending module, configured to send first information and/or first indication information to a first target end, where the first information includes at least one of the following:
- index information of a second authentication server;
- vendor-related information of the first communications device; and
- address-related information of the second authentication server.

The first indication information is used for requesting to obtain a credential related to a first network, or used to indicate that an access type is a restricted service.

According to a seventh aspect, an embodiment of the present invention provides a communications device, and the communications device is a second communications device, including:
- an obtaining module, configured to obtain at least one of first information, first indication information, and third information; and
- an execution module, configured to perform a first operation based on the first information, the first indication information, and the third information.

The first information includes at least one of the following: index information of a second authentication server, vendor-related information of a first communications device, and address-related information of the second authentication server.

The first indication information is used for requesting to obtain a credential related to a first network, or used to indicate that an access type is a restricted service.

The third information includes at least one of the following:
- mapping information between the index information of the second authentication server and the address-related information of the second authentication server; and
- the address-related information of the second authentication server.

According to an eighth aspect, an embodiment of the present invention provides a communications device, and the communications device is a third communications device, including:
- a sending module, configured to send third information.

The third information includes at least one of the following:
- mapping information between index information of a second authentication server and address-related information of the second authentication server; and
- the address-related information of the second authentication server.

According to a ninth aspect, an embodiment of the present invention provides a communications device, and the communications device is a fourth communications device, including:
- an obtaining module, configured to obtain second information; and
- an execution module, configured to perform a second operation based on the second information.

The second information includes at least one of the following:
- related information for establishing a first data channel;
- second indication information;
- address-related information of a first server; and
- address-related information of a second authentication server.

The first server is a server capable of configuring a credential related to a first network.

The first data channel is a data channel in the first network.

The second indication information is used to indicate at least one of the following:
- the first data channel is used for interaction between a first communications device and the first server;
- the first data channel is used by the first communications device to request the credential related to the first network; and
- the first data channel is used for configuring, for the first communications device, the credential related to the first network.

According to a tenth aspect, an embodiment of the present invention provides a communications device, and the communications device is a fifth communications device, including:
- a sending module, configured to send second information; where the second information includes at least one of the following:
- related information for establishing a first data channel;
- second indication information;
- address-related information of a first server; and
- address-related information of a second authentication server.

The first server is a server capable of configuring a credential related to a first network.

The first data channel is a data channel in the first network.

The second indication information is used to indicate at least one of the following:
- the first data channel is used for interaction between a first communications device and the first server;
- the first data channel is used by the first communications device to request the credential related to the first network; and the first data channel is used for configuring, for the first communications device, the credential related to the first network.

According to an eleventh aspect, an embodiment of the present invention provides a communications device, including a processor, a memory, and a computer program stored on the memory and capable of running on the processor. When the computer program is executed by the processor, the steps of the access control method according to the first aspect are implemented, or the steps of the access control method according to the second aspect are implemented, or the steps of the access control method according to the third aspect are implemented, or the steps of the access control method according to the fourth aspect are implemented, or the steps of the access control method according to the fifth aspect are implemented.

According to a twelfth aspect, an embodiment of the present invention provides a computer-readable storage medium, where a computer program is stored in the computer-readable storage medium, and when the computer program is executed by a processor, the steps of the access control method according to the first aspect are implemented, or the steps of the access control method according to the second aspect are implemented, or the steps of the access control method according to the third aspect are implemented, or the steps of the access control method according to the fourth aspect are implemented, or the steps of the access control method according to the fifth aspect are implemented.

In the embodiments of the present invention, the first information and/or the first indication information is sent to the first target end, where the first information includes at least one of the following: the index information of the second authentication server, the vendor-related information of the first communications device; and the address-related information of the second authentication server. The first indication information is used for requesting to obtain the credential related to the first network, or used to indicate that the access type is a restricted service. In this way, information related to authentication of the communications device can be obtained, and authentication and configuration for the communications device can be further performed in a case that the communications device has not obtained a network-related credential. Specifically, the first network can select the second authentication server to perform authentication on the first communications device, so as to support authentication on the terminal when the terminal with no credential related to the first network accesses the first network. This avoids security attacks on the first network by counterfeit and illegitimate terminals. In addition, configuration for the first communications device is supported, so that a legitimate terminal can obtain the credential related to the first network.

BRIEF DESCRIPTION OF DRAWINGS

Other advantages and benefits will become apparent to those of ordinary skill in the art by reading detailed description of the exemplary embodiments below. The accompanying drawings are merely intended to illustrate the objectives of the preferred embodiments and are not intended to limit the present invention. Throughout the accompanying drawings, the same reference numerals represent the same components. In the accompanying drawings.

DETAILED DESCRIPTION

Figure 1:
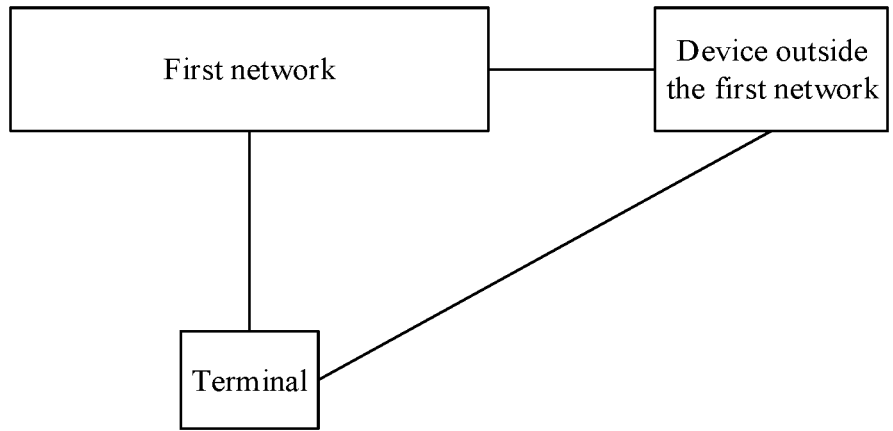
FIG. 1 is a schematic architectural diagram of a wireless communications system according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of the present invention, the term "an example" or "for example" is used to represent an example, an illustration, or a description. Any embodiment or design scheme described as "an example" or "for example" in the embodiments of the present invention should not be construed as being more preferred or advantageous than other embodiments or design schemes. To be precise, the words such as "an example" or "for example" are intended to present a related concept in a specific manner.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

The following describes the embodiments of the present invention with reference to the accompanying drawings. An access control method and a communications device provided in the embodiments of the present invention may be applied to a wireless communications system. The wireless communications system may be a 5G system, an evolved long term evolution (eLTE) system, or a later evolved communications system.

The following describes the embodiments of the present invention with reference to the accompanying drawings. The access control method and the communications device provided by the embodiments of the present invention may be applied to a network system shown in FIG. 1. The network system shown in FIG. 1 includes: a terminal (UE), a first network, and a device outside the first network, for example, a vendor device.

The terminal may access the first network, for example, an SNPN (non-public network), and the SNPN may be a 5G communications network, and includes, for example, a 5G radio access network (NG-RAN), an access and mobility management function (AMF), a session management function (SMF), and a user plane function (UPF).

The vendor device may be a related device of a terminal vendor (vendor, also referred to as provider), for example, a vendor server, an application function (AF), and an authentication, authorization and accounting (AAA) server.

The vendor device may perform authentication on the terminal, or the SNPN may perform authentication on the terminal based on information about the vendor device.

It should be noted that the network system shown in FIG. 1 is only an example for description, to which the access control method and the communications device provided by the embodiments of the present invention are applicable, which is not limited in the embodiments of the present invention. For example, the network system may further include: a unified data management (UDM), a network exposure function (NEF), and a configuration server (Config server).

In addition, this may further be applied to a communications system such as 4G and 6G.

The access control method provided in the embodiments of the present invention can also resolve the following technical problems:

Problem 1: It is necessary to resolve a problem of how to select an authentication server when the UE without a credential related to the first network accesses the first network.

Scenario 1: When being delivered from the factory, the terminal UE in the first network (for example, the SNPN) still has no credential (such as a credential) of the SNPN, and cannot pass authentication by the SNPN. One solution is that the UE first initially accesses the SNPN, the SNPN configures a credential for the UE, and then the UE accesses the SNPN based on the newly configured credential.

In the process in which the UE with no credential of the SNPN initially accesses the SNPN, because the SNPN cannot perform authentication on the UE, all UEs requesting access are allowed, for example, to establish a user plane PDU session to a configuration server of the credential. Because there is no authentication mechanism in the SNPN, the configuration server of the credential is required to trigger authentication on the UE. UE connections and PDU session resources are released after the authentication fails.

In such a manner of resources allocation before authentication, there are potential risks of attacks, that is, illegitimate UEs in the SNPN initiate initial access, which uses up resources of the SNPN; in addition, counterfeit UEs may pretend to be legitimate UEs to access.

Therefore, in the process in which the UE with no credential of the SNPN initially accesses the SNPN, the UE also needs to be authenticated. A feasible method is to perform authentication by using an authentication server of the UE vendor. Before the UE is delivered from the factory, the UE vendor may configure, for the UE, a credential that can be authenticated by the authentication server of the UE vendor. An interface may be provided between the SNPN and a server of the vendor, so that after the UE accesses the SNPN, authentication is performed between the UE and the authentication server of the vendor, to implement mutual authentication between the UE and the SNPN. Because there may be a plurality of vendors for UEs in the SNPN, there are authentication servers of the plurality of vendors. Therefore, it is necessary to resolve a problem of how to select an authentication server when the UE without a credential related to the first network accesses the first network.

Scenario 2: In addition, an international mobile equipment identity (IMEI) or permanent equipment identifier (PEI) contains tracking area code (TAC) information, which can be used to identify a vendor. However, one TAC of the vendor may cover only several hundred terminals. TACs for identifying the vendor need to be continuously synchronized to the SNPN, resulting in complexity of maintenance. Therefore, it is necessary to resolve the problem of how to efficiently select an authentication server of a vendor.

An optional method is that an interface is provided between a related device of the vendor and the first network, to provide the first network with mapping information between address information of an authentication server and index information of the authentication server. When the UE with no credential of the first network accesses the first network, the UE provides the index information of the authentication server. Based on the index information of the authentication server provided by the UE and based on the mapping information, provided for the first network by the vendor, between the address information of the authentication server and the index information of the authentication server, the first network determines an address of the authentication server, and initiates a UE authentication request to the authentication server. The authentication server may be a related device of the UE vendor.

Another optional method is to obtain address-related information of a credible authentication server through mutual authentication between the related device of the vendor and the first network. When the UE with no credential of the first network accesses the first network, the UE provides the address-related information of the authentication server. Based on the address-related information of the authentication server provided by the UE and address-related information of the authentication server provided externally, the first network determines that the address-related information of the authentication server is credible, and initiates a UE authentication request to the authentication server.

Scenario 3: When terminals in the first network have only one vendor, there is an authentication server of the one vendor. When a terminal with no credential related to the first network accesses the first network, the first network cannot distinguish whether the terminal is a terminal attempting to access other restricted services (such as an emergency service), or a terminal accessing the first network in an attempt to obtain a credential related to the first network. For the latter, the terminal needs to be authenticated by the authentication server of the vendor. Therefore, it is necessary to resolve the problem of whether to perform authentication on the terminal by using an external authentication server.

An optional method is that when accessing the first network, the UE sends the first indication information for requesting to obtain a credential related to the first network, or for indicating that an access type is a restricted service. Based on the first indication information, the first network may determine whether to perform authentication on the terminal by using an external authentication server (for example, an authentication server of the terminal vendor).

Problem 2: It is necessary to resolve the problem of how the UE obtains address-related information of the configuration server of the credential.

When being delivered from the factory, the terminal UE in the first network (for example, the SNPN) still has no credential related to the first network, nor information about the configuration server of the credential.

An optional method is that the UE vendor configures address-related information or index information of the configuration server for the UE. For the configuration server in one-to-one correspondence to the first network, information about the first network still needs to be configured.

Another optional method is that after the UE accesses the first network and is authenticated successfully, the first network provides the UE with the address-related information or index information of the configuration server. Because the UE has been authenticated successfully, the UE and the first network trust each other in this case. It is easy to understand that the address-related information of the configuration server provided at that time is credible.

Question 3: After authenticating the UE successfully, the authentication server can prove an identity of the UE to be a not-counterfeit UE. However, the problems of how to determine whether the UE is legitimate UE in the first network and whether configuring a credential related to the first network for the UE is allowed still need to be resolved.

An optional method is that UE being authenticated successfully by the authentication server indicates that the UE is legitimate UE in the first network. In other words, the authentication server authenticates the UE to be UE, and also authenticates the UE to be legitimate UE in the first network.

An optional method is that after the UE is authenticated successfully by the authentication server, the first network determines that the UE is legitimate UE in the first network.

Question 4: The UE requests the configuration server to configure a credential related to the first network for the UE. Before configuring the credential for the UE, the configuration server also needs to determine that the UE is legitimate UE in the first network, or determine that configuring the credential related to the first network for the UE is allowed.

An optional method is to implement mutual authentication between the UE and the authentication server by using the configuration server. Mutual authentication between the UE, the configuration server, and the authentication server can be implemented through an interface provided between the configuration server and the authentication server. Because there may be a plurality of vendors for UEs in the SNPN, there are authentication servers of the plurality of vendors. Therefore, it is necessary to resolve the problem of how to select an authentication server when the UE with no credential related to the first network requests the configuration server to configure the credential related to the first network for the UE. This question is analogous to Question 1.

Another optional method is that the configuration server relies on the first network to authenticate legitimacy of the UE, and considers UEs to be legitimate provided that the UE is able to access the configuration server through the SNPN. Legitimacy authentication on the UE by the first network is similar to that in Question 3.

Question 5: When being delivered from the factory, the terminal UE in the first network (for example, the SNPN) still has no credential related to the first network, nor configuration of related parameters for requesting PDU session establishment in the first network, for example, NSSAI, SSC Mode, and DNN. It is necessary to resolve the problem of obtaining information required by the UE for initiating a request for establishing a first PDU session, where the first PDU session is used to request to configure a credential related to the first network.

An optional method is to configure a terminal routing policy for an address of the configuration server. Only the UE is allowed to access the configuration server.

In an optional embodiment of the present invention, the first network includes an SNPN.

In an optional embodiment of the present invention, a credential may also be referred to as security information, and includes parameters that can be used for authentication and/or encryption, such as a root key. The root key may be used to derive a CK and an IK.

In an optional embodiment of the present invention, the credential related to the first network may include a credential for accessing the first network. The credential for accessing the first network may include a credential that can be directly authenticated by an authentication server of the first network, or a credential that can be indirectly authenticated. Authentication by an authentication server outside the first network may be understood as indirect authentication. It is easy to understand that, in this case, the configuration server may configure, for the UE, a credential that can be directly authenticated by the first network or configure a credential that can be indirectly authenticated by the first network.

In an optional embodiment of the present invention, the credential related to the first network may include at least one of the following: a credential directly related to the first network, a credential for accessing a normal service of the first network, a credential that can be directly authenticated by an authentication server of the first network, and a credential for accessing an unrestricted service of the first network. It is easy to understand that, in this case, the configuration server may configure, for the UE, a credential that can be directly authenticated by the first network.

In another optional embodiment of the present invention, the credential unrelated to the first network may include at least one of the following: a credential not directly related to the first network. The credential not directly related to the first network may include a credential that cannot be directly authenticated by an authentication server of the first network. The credential authenticated by the authentication server outside the first network may be construed as a credential unrelated to or not directly related to the first network.

In an optional embodiment of the present invention, the second credential may include at least one of the following:
- a credential unrelated to the first network;
- a credential for accessing the first network in a case that the terminal has no credential related to the first network;
- a credential for accessing the first network in a case that the terminal requests for configuration of the credential related to the first network;
- a credential for accessing a restricted service of the first network;
- a credential configured for the first communications device by a vendor of the first communications device; and
- a credential that can be authenticated by the second authentication server.

In an optional embodiment of the present invention, the restricted service includes at least one of the following: only control plane being allowed while user plane being prohibited, only access to the first server (which may include the configuration server) being allowed, and only a credential download application being allowed. In an implementation, the credential related to the first network may be configured through the control plane. Therefore, it is possible to restrict the terminal to accessing the first network only on the control plane. In an implementation, the credential related to the first network may be configured for the terminal on the user plane. Therefore, it is easy to understand that the restricted service may allow only terminals to access the first server. Only access to the first server being allowed includes that a data channel established by the terminal in the first network is merely used for accessing the first server.

In an optional embodiment of the present invention, the first server includes a configuration server. The first server is capable of processing a request for configuring a credential related to the first network for the terminal. The configuration server is capable of configuring a credential related to the first network for a communications device. The first server may be a server belonging to the first network.

In an optional embodiment of the present invention, when processing the request for configuring the credential related to the first network for the terminal, the first server may request the second authentication server to perform authentication on the terminal. In this case, the first server is an intermediate server for authentication.

In an optional embodiment of the present invention, initial authentication includes authentication on the terminal performed by the first network when the terminal has no credential related to the first network to access the first network. It is easy to understand that the initial authentication is indirect authentication.

In an optional embodiment of the present invention, the configuration server is also referred to as a first server.

In an optional embodiment of the present invention, the credential related to the first network may be used interchangeably with a first-network related credential, both having the same meaning.

In an optional embodiment of the present invention, vendor-related information may be referred to as vendor information or information about the vendor. The vendor-related information includes: vendor identification information (for example, a vendor ID or TAC).

In an embodiment of the present invention, address-related information of a server may include at least one of the following: IP address, MAC address, port number, fully qualified domain name (FQDN), uniform resource locator (URL), operating system identification information, and application identification information. The address-related information of the authentication server or the address-related information of the first server is the same as the address-related information of the server.

In an embodiment of the present invention, unless otherwise specified (for example, the authentication server of the first network), the authentication server is an abbreviation of the second authentication server. The second authentication server includes an authentication server of the terminal vendor.

In the embodiments of the present invention, optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of the present invention. For example, when specific capability indication information transmitted by a device is not received, it can be deduced that the device does not support the capability.

Optionally, transmitting may include broadcasting, broadcasting through a system message, or returning a response after receiving the request.

Optionally, being preconfigured may be referred to as being a default.

In an optional embodiment of the present invention, a data channel may include but is not limited to one of the following: a PDU session, a PDN connection, a QoS flow, a bearer, and an Internet Protocol Security (IPsec) channel, where the bearer may be an evolved radio access bearer (E-RAB), a radio access bearer (RAB), a data radio bearer (DRB), a signaling radio bearer (SRB), and the like.

In an optional embodiment of the present invention, the communications device may include at least one of the following: a communications network element and a terminal.

In an embodiment of the present invention, the communications network element may include at least one of the following: a core network network element and a radio access network network element.

In the embodiments of the present invention, a core-network network element (CN network element) may include but is not limited to at least one of the following: a core network device, a core network node, a core network function, a core-network network element, a mobility management entity (MME), an access mobility management function (AMF), a session management function (SMF), a user plane function (UPF), a serving gateway (SGW), a PDN gateway (PDN-GW), a policy control function (PCF), a policy and charging rules function unit (PCRF), a GPRS serving support node (Serving GPRS Support Node, SGSN), a gateway GPRS support node (GGSN), a unified data management (UDM), a unified data repository (UDR), a home subscriber server (HSS), an application function (AF), and a centralized network configuration (CNC).

In the embodiments of the present invention, a radio access network (RAN) network element may include but is not limited to at least one of the following: a radio access network device, a radio access network node, a radio access network function, a radio access network unit, a Third Generation Partnership Project (3GPP) radio access network, a non-3GPP radio access network, a centralized unit (CU), a distributed unit (DU), a base station, an evolved Node B (eNB), a 5G base station (gNB), a radio network controller (RNC), a base station (NodeB), a non-3GPP interworking function (N3IWF), an access controller (AC) node, an access point (AP) device, a wireless local area network (WLAN) node, or an N3IWF.

The base station may be a base transceiver station (BTS) in a Global System for Mobile Communications (GSM) or Code Division Multiple Access (CDMA) network, may be a base station (NodeB) in wideband Code Division Multiple Access (WCDMA), or may be an evolved NodeB (eNB or eNodeB) in LTE, or a 5G NodeB (gNB). This is not limited in the embodiments of the present invention.

In the embodiments of the present invention, the UE is a terminal. The terminal may include a relay that supports a terminal function, or a terminal that supports a relay function. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal is not limited in the embodiments of the present invention.

The method and the communications device provided in the embodiments of the present invention may be applied to a wireless communications system. The wireless communications system may be a fifth-generation (5G) mobile communications system, or an evolved packet system (EPS), or a later evolved communications system. The wireless communications system in the embodiments of the present invention may be a fifth generation mobile communications network (Fifth-generation system, 5GS) or an LTE network.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 2:
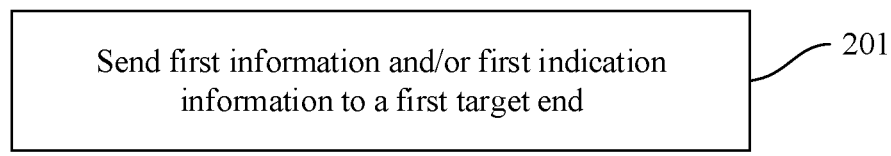
FIG. 2 is a flowchart of an access control method according to an embodiment of the present invention.

Referring to FIG. 2, an embodiment of the present invention provides an access control method, applied to a first communications device. The first communications device includes but is not limited to one of the following: a terminal (UE), a first server, and a CN network element (for example, an AMF or a security anchor function (SEAF)). The method includes:

Step 201: Send first information and/or first indication information to a first target end, where the first information includes at least one of the following:

index information of a second authentication server;
 vendor-related information of the first communications device; and
 address-related information of the second authentication server.

The first indication information is used for requesting to obtain a credential related to a first network, or used to indicate that an access type is a restricted service.

In an implementation, the first target end may include: a communications device in the first network, for example, an AMF in the first network, and the first network may be an SNPN.

In another implementation, the first target end may include the first server (including a configuration server or an intermediate server for authentication).

In a case that the first communications device is a terminal, the first target end may be a communications device in the first network or the first server.

In a case that the first communications device is a CN device (for example, an AMF) in the first network, the first target end may be the first server.

In an implementation, the first communications device may have a second credential. In an implementation, the second authentication server may have a second credential.

Optionally, the second credential may include at least one of the following:

a credential unrelated to the first network; a credential for accessing the first network in a case that the terminal has no credential related to the first network;
 a credential for accessing the first network in a case that the terminal requests for configuration of the credential related to the first network;
 a credential for accessing a restricted service of the first network;
 a credential configured for the first communications device by a vendor of the first communications device; and
 a credential that can be authenticated by the second authentication server.

In an implementation, the second authentication server includes at least one of the following: an authentication server outside the first network, an authentication server of a service provider, an authentication server of the vendor of the first communications device, and an authentication server having the second credential or capable of authenticating the second credential.

Optionally, the service provider may be outside the first network.

In an implementation, the vendor is the vendor of the first communications device to which the second authentication server belongs.

Optionally, the vendor-related information includes: vendor identification information (for example, a vendor ID or TAC).

In an implementation, the index information of the second authentication server may include at least one of the following: address-related information (such as IP, FQDN, or URL) of the second authentication server and identification information of a terminal vendor to which the second authentication server belongs.

In an implementation, the first indication information being used for requesting to obtain the credential related to the first network may be requesting, by using the first indication information, to obtain the credential related to the first network.

In an optional embodiment of the present invention, the credential related to the first network may include at least one of the following: a credential directly related to the first network, a credential for accessing a normal service of the first network, a credential that can be directly authenticated by an authentication server of the first network, and a credential for accessing an unrestricted service of the first network. It is easy to understand that, in this case, the first server may configure, for the UE, a credential that can be directly authenticated by the first network.

In another optional embodiment of the present invention, the credential unrelated to the first network may include at least one of the following: a credential not directly related to the first network. The credential not directly related to the first network may include a credential that cannot be directly authenticated by an authentication server of the first network. A credential authenticated by an authentication server outside the first network may be construed as a credential unrelated to or not directly related to the first network.

Figure 3:
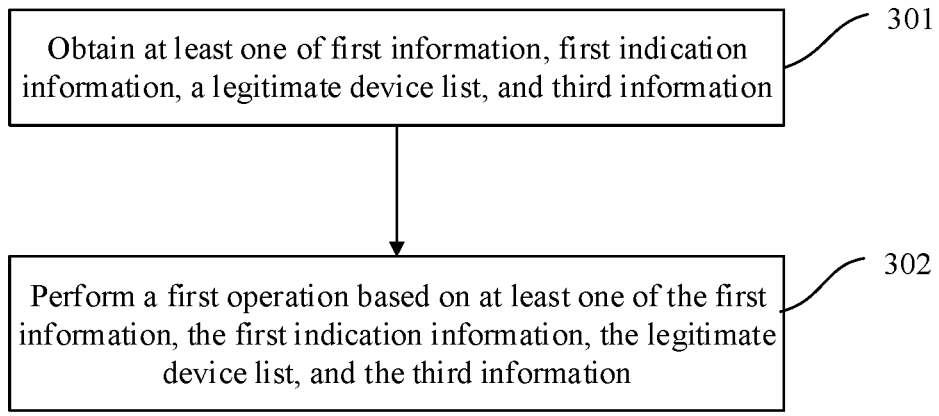
FIG. 3 is a flowchart of another access control method according to an embodiment of the present invention.

In this embodiment of the present invention, the first information and/or the first indication information can be sent to the first target end in the foregoing step, so that the first target end can perform a first operation based on the first information and/or the first indication information, as specifically described in the embodiment of FIG. 3.

For example, the first operation includes at least one of the following operations:
determining the second authentication server;
determining to request the second authentication server to perform authentication on the first communications device;
requesting the second authentication server to perform authentication on the first communications device;
requesting a first server to perform authentication on the first communications device;
sending the first information to the first server;
determining whether the first communications device is a legitimate device in the first network;
determining whether configuring, for the first communications device, the credential related to the first network is allowed; and
determining whether accepting a registration request of the first communications device by the first network is allowed.

The first server is a server capable of configuring, for the first communications device, the credential related to the first network, so as to implement a purpose of access control on the first communications device by the first network.

Optionally, the sending first information includes:
in a case that a first condition is satisfied, sending the first information; where the first condition includes at least one of the following:
the first communications device has a second credential;
the first communications device has no credential related to the first network;
the first communications device requests to access the first network;
the first communications device requests to access a restricted service of the first network;
the first communications device requests to obtain a credential related to the first network;
at least one piece of the first information has been obtained;
request information for the first information has been obtained;
information that the first network supports the restricted service has been obtained;
information that the first network supports and/or requests authentication for the restricted service has been obtained;
information that the first network supports and/or requests authentication on the first communications device has been obtained; and
information that the first network supports configuring, for the first communications device, the credential related to the first network has been obtained.

In an implementation, an identity request sent by the first target end is obtained and a type of the identity request is a vendor-related type of the first communications device.

The second credential is described above, and details are not repeated herein.

In an implementation, that the first network supports and/or requests authentication on the first communications device may include at least one of the following:
the first communications device supports and/or requests authentication on the first communications device that is performed between the first network and the second authentication server; and
the first network supports and/or requests authentication on the first communications device based on the second credential.

The first communications device may be a terminal that has no credential related to the first network. It is easy to understand that in a case that the terminal accesses the first network before the credential related to the first network is configured, for the sake of more security, the first network may require authentication on the terminal to be performed based on the second credential (for example, a credential configured for the terminal by a vendor of the terminal). Upon such requirement, the terminal may provide related index information of the second authentication server to the first network, so as to support authentication.

In an implementation, the information that the first network supports and/or requests authentication on the first communications device having been obtained may include at least one of the following:
information that the first network supports and/or requests authentication on the first communications device by the second authentication server has been obtained; and
information that the first network supports and/or requests authentication on the first communications device to be performed based on the second credential has been obtained.

The first communications device may be a terminal that has no credential related to the first network.

It is easy to understand that in a case that the terminal accesses the first network before the credential related to the first network is configured, for the sake of more security, the first network may require authentication on the terminal to be performed based on the second credential. Upon such requirement, the terminal may provide related index information of the second authentication server to the first network, so as to support authentication.

In an implementation, the first communications device preconfigures the first information. It is easy to understand that, when the first communications device is delivered from the factory, the vendor of the first communications device preconfigures the first information on the first communications device.

Specifically, the credential related to the first network is described above, and details are not repeated herein.

In an implementation manner, the first network may broadcast at least one of the following in a cell:
information that the first network supports the restricted service;
information that the first network supports and/or requests authentication for the restricted service;
information that the first network supports and/or requests authentication on the first communications device; and
information that the first network supports configuring, for the first communications device, the credential related to the first network.

In an implementation, the information that the first network supports and/or requests authentication on the first communications device includes information that the first network supports and/or requests initial authentication. The initial authentication supported and/or requested includes that authentication on the first communications device is still supported and/or requested when the first communications device with no credential related to the first network accesses the first network or before the step that the first communications device requests for configuration of the credential related to the first network. The initial authentication may be performed between a first authentication server and the first communications device through the first network.

It is easy to understand that when the first communications device has no credential related to the first network, the first network can still perform authentication on the first communications device by using the first authentication server.

In an implementation, when the first network broadcasts, in a cell, an indication for requesting initial authentication, the first communications device requests the first network for index information of the second authentication server.

Optionally, the request information for the first information includes at least one of the following:

first request information, where the first request information is used to request vendor information of the first communications device;

second request information, where the second request information is used to request index information of the second authentication server; and third request information, where the third request information is used to request address-related information of the second authentication server.

In an implementation, the obtaining the first request information sent by the first target end (for example, the AMF in the first network), where the first request information is used to request vendor information of the first communications device includes: obtaining an identity request sent by the first target end, where a type of the identity request is a vendor-related type of the first communications device (for example, a vendor-related type of the terminal). In an implementation, the first information and/or the first indication information is sent by using the control-plane signaling. In an implementation, the first information and/or the first indication information is sent by using a non-access stratum access request (for example, a registration request message or an attach request message).

Optionally, before the step of sending first information, the method further includes:

sending an access request and/or sending the first indication information to the first target end.

The first indication information is used for requesting to obtain a credential related to a first network, or used to indicate that an access type is a restricted service.

In an implementation, the first indication information may be embodied as an access cause (for example, a radio resource control (RRC) cause or a non-access stratum (NAS) access cause), an access request, or an access type.

Optionally, before the step of sending first information, the method further includes:

receiving at least one of the following information that is sent by the first target end:
request information for the first information;
information that the first network supports the restricted service;
information that the first network supports and/or requests authentication for the restricted service;
information that the first network supports and/or requests authentication on the first communications device; and
information that the first network supports configuring, for the first communications device, the credential related to the first network.

In an implementation, the first target end sends the request information for the first information after receiving the access request and/or the first indication from the first communications device.

In an implementation, information about authentication on the first communications device may be vendor-related information of the terminal, index information of the second authentication server, and address information of the second authentication server.

Figure 5:
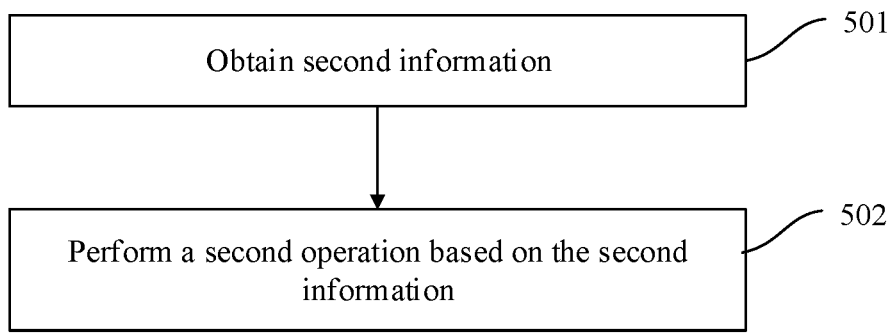
FIG. 5 is a flowchart of another access control method according to an embodiment of the present invention.

Optionally, the method further includes:
obtaining second information, where the second information is specifically as the second information described in the embodiment of FIG. 5.

For example, the second information includes at least one of the following:
a first terminal routing policy (for example, URSP);
default DNN information being left blank;
default slice information being left blank;
related information for establishing a first data channel;
second indication information;
third indication information;
address-related information of a first server; and
address-related information of the second authentication server.

The first server is a server capable of configuring a credential related to the first network.

The first terminal routing policy is used for accessing the first server or a credential download application.

The first data channel is a data channel in the first network.

The second indication information is used to indicate at least one of the following:
the first data channel is used for interaction between the first communications device and the first server;
the first data channel is used by the first communications device to request the credential related to the first network; and
the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

In an implementation, the related information for establishing the first data channel (the data channel is, for example, a PDU session) includes at least one of the following:
data network name (DNN), slice information (such as NSSAI), session and service continuity mode (SSC Mode), and data channel type (such as PDU session type).

In an implementation, the first data channel is a data channel in the first network and is a data channel used for downloading a credential related to the first network.

In an implementation manner, after receiving the second information, the first communications device may establish the first data channel.

In this embodiment of the present invention, the first information and/or the first indication information is sent to the first target end, where the first information is described above, and details are not repeated herein. In this way, the first network can select the second authentication server to perform authentication on the first communications device, so as to support authentication on the terminal when the terminal with no credential related to the first network accesses the first network. This avoids security attacks on the first network by counterfeit and illegitimate terminals. In addition, configuration for the first communications device is supported, so that a legitimate terminal can obtain the credential related to the first network to access a service of the first network.

Referring to FIG. 3, an embodiment of the present invention further provides an access control method, applied to a second communications device. The second communications device includes but is not limited to one of the following: a communications device (for example, an AMF, a SEAF, or an AF) in the first network, a first server, and a second authentication server. The method includes the following steps.

Step 301: Obtain at least one of first information, first indication information, a legitimate device list, and third information.

Step 302: Perform a first operation based on at least one of the first information, the first indication information, the legitimate device list, and the third information.

The first information includes at least one of the following: index information of a second authentication server, vendor-related information of a first communications device, and address-related information of the second authentication server.

The first indication information is used for requesting to obtain a credential related to a first network, or used to indicate that an access type is a restricted service.

The third information includes at least one of the following:
mapping information between the index information of the second authentication server and the address-related information of the second authentication server; and
the address-related information of the second authentication server.

In an implementation manner, the third information provides information related to a legitimate second authentication server. It is easy to understand that "the address-related information of the second authentication server" in the third information may be compared against "the address-related information of the second authentication server" in the first information, so as to determine that "the address-related information of the second authentication server" in the first information is valid.

In an implementation manner, at least one of the first information, the first indication information, and the third information may include: any one of the first information, the first indication information, and the third information, or a combination of any one of the first information, the first indication information, and the third information.

In an implementation, for the first information, reference may be made to the first information in the embodiment shown in FIG. 2, and for the first indication information, reference may be made to the first indication information in the embodiment shown in FIG. 2, which are not repeated herein.

In an implementation, the first information and/or the first indication information is obtained from the first communications device. In an implementation, the third information is obtained from a third communications device.

In an implementation, the first information and/or the first indication information is obtained from an access request (for example, a registration request message or an attach request message).

In an implementation, the mapping information between the index information of the second authentication server and the address-related information of the second authentication server may be used to determine the address-related information of the second authentication server.

Optionally, the first operation includes at least one of the following:
determining the second authentication server;
determining to request the second authentication server to perform authentication on the first communications device;
requesting the second authentication server to perform authentication on the first communications device;
requesting a first server to perform authentication on the first communications device;
sending the first information to the first server;
determining whether the first communications device is a legitimate device in the first network;
determining whether configuring, for the first communications device, the credential related to the first network is allowed; and
determining whether accepting a registration request of the first communications device by the first network is allowed.

The first server is a server capable of configuring, for the first communications device, the credential related to the first network, The determining the second authentication server includes determining the address-related information of the second authentication server.

Further, the step of determining the second authentication server may include but is not limited to at least one of the following: (1) determining the second authentication server based on "the index information of the second authentication server" in the first information and "the mapping information between the index information of the second authentication server and the address-related information of the second authentication server" in the third information. It is easy to understand that the determining the second authentication server may include selecting, for the terminal, a second authentication server that matches the index information of the second authentication server.

(2) Determining the second authentication server based on the vendor-related information of the first communications device in the first information and the mapping information between the index information of the second authentication server and the address-related information of the second authentication server in the third information. It is easy to understand that the determining the second authentication server may include selecting, for the terminal, a second authentication server corresponding to "vendor-related information of the first communications device".

(3) Determining the second authentication server based on the address-related information of the second authentication server in the first information and/or the address-related information of the second authentication server in the third information. It is easy to understand that the determining the second authentication server may include selecting, for the terminal, a second authentication server that matches "the address-related information of the second authentication server" in the first information. The "address-related information of the second authentication server" in the first information is compared with that in the third information, so as to determine that the "address-related information of the second authentication server" in the first information is valid address-related information of the second authentication server.

(4) Determining the second authentication server based on the first indication information and/or "the address-related information of the second authentication server" in the third information. It is easy to understand that the determining the second authentication server may include selecting, based on the first indication information, a second authentication server that is corresponding to "the address-related information of the second authentication server" in the third information.

Further, the step of determining to request the second authentication server to perform authentication on the first communications device may include but is not limited to at least one of the following:
  i. determining, based on the first indication information and/or the first information, to request the second authentication server to perform authentication on the first communications device; and
  ii. determining, based on the first indication information and/or "the address-related information of the second authentication server" in the third information, to request the second authentication server to perform authentication on the first communications device.

In an implementation, through authentication by the second authentication server, the first network may determine whether the first communications device is a counterfeit device. When authentication on the first communications device by the second authentication server is successful, it may be further determined, based on the legitimate device list, whether the first communications device is a legitimate device in the first network and/or whether configuring the credential related to the first network for the first communications device is allowed.

In another implementation, through authentication by the second authentication server, the first network may determine whether the first communications device is a counterfeit device and whether the first communications device is a legitimate device in the first network. In an implementation, the legitimate device may include a device (for example, the device is a terminal) for which configuring a credential related to the first network is allowed. In another implementation, the legitimate device may include a device (for example, the device is a terminal) with no credential related to the first network and for which configuring a credential related to the first network is allowed.

In an implementation manner, the legitimate terminal list may be configured in a user management server (for example, a UDM, an HSS, or a UDR) of the first network. The legitimate device list may be obtained from the user management server.

The legitimate device list includes at least one of the following: a legitimate communications device, not yet configured with a credential related to the first network, in the first network; and a communications device for which configuring a credential related to the first network is allowed.

Optionally, the legitimate device list is a legitimate terminal list. The legitimate terminal list may be information about a group of terminals. In an implementation, the information about the terminal may include an identifier of the terminal, such as IMEI, PEI, GPSI, MAC address, or SUPI (in this case, the SUPI is not a SUPI in the first network).

Optionally, the legitimate terminal list may include at least one of the following: a legitimate terminal, not yet configured with a credential related to the first network, in the first network; and a terminal for which configuring a credential related to the first network is allowed.

It is easy to understand that, in an implementation, through authentication by the second authentication server, the first network may determine that the terminal is a terminal (that is, a non-counterfeit terminal), and based on the legitimate terminal list, the first network may determine whether the terminal is a legitimate terminal and whether configuring a credential related to the first network for the terminal is allowed.

It is easy to understand that, in another implementation, through authentication by the authentication server, the first network may determine that the terminal is a terminal and is a legitimate terminal in the first network. In other words, the authentication server directly authenticates that the terminal is a non-counterfeit terminal and is a legitimate terminal in the first network, allowing configuration of the credential related to the first network.

The first server may also be referred to as a configuration server or an intermediate server for authentication.

Optionally, in a case that the first communications device satisfies a second condition, the first communications device is determined to be a legitimate device in the first network.

The second condition includes at least one of the following:
  the first communications device is authenticated successfully by the second authentication server; and
  the first communications device is a communications device in the legitimate device list.

The legitimate device list is described above, and details are not repeated herein.

Optionally, before the step of obtaining first information, the method further includes:
  receiving an access request and/or first indication information from the first communications device; where the first indication information is used for requesting to obtain the credential related to the first network, or used to indicate that the access type is a restricted service; and
  sending request information for the first information based on the access request and/or the first indication information.

In an implementation, the sending request information for the first information may be sending to the first communications device, so as to request the first communications device to send the first information.

In an implementation, the first information and/or the first indication information of the first communications device is received from the first communications device.

In an implementation, the request information for the first information is sent to the first communications device.

Optionally, the request information for the first information includes at least one of the following:
  first request information, where the first request information is used to request vendor information of the first communications device;
  second request information, where the second request information is used to request index information of the second authentication server; and
  third request information, where the third request information is used to request address-related information of the second authentication server.

In an implementation, the sending the first request information, where the first request information is used to request vendor information of the first communications device includes: sending an identity request, where a type of the identity request is a vendor-related type of the first communications device, for example, a vendor-related type of the terminal.

Optionally, the method further includes:
in a case that the first communications device is determined to be a legitimate device in the first network, sending second information, where the second information includes at least one of the following:
related information for establishing a first data channel;
second indication information; and
address-related information of a first server.

The first server is a server capable of configuring a credential related to the first network.

The first data channel is a data channel in the first network.

The second indication information is used to indicate at least one of the following:
the first data channel is used for interaction between the first communications device and the first server;
the first data channel is used by the first communications device to request the credential related to the first network; and
the first data channel is used for configuring, for the first communications device, the credential related to the first network.

In an implementation, the first information and/or the first indication information is obtained from the first communications device.

In an implementation, the third information is obtained from a third communications device.

In an implementation, the first information and/or the first indication information is obtained from an access request (for example, a registration request message or an attach request message).

In an implementation, the address-related information of the second authentication server may be determined based on "the index information of the second authentication server" in the first information, and "the mapping information between the index information of the second authentication server and the address-related information of the second authentication server" in the third information.

In another implementation, based on the "address-related information of the second authentication server" in the first indication information and the third information, authentication on the first communications device by the second authentication server may be determined, and/or the address-related information of the second authentication server is determined.

According to this embodiment, at least one of the first information, the first indication information, the legitimate device list, and the third information can be obtained. The first operation is performed based on the at least one of the first information, the first indication information, the legitimate device list, and the third information. In this way, the first network can select the second authentication server to perform authentication on the first communications device, so as to support authentication on the terminal when the terminal with no credential related to the first network accesses the first network. This avoids security attacks on the first network by counterfeit and illegitimate terminals. In addition, configuration for the first communications device is supported, so that a legitimate terminal can obtain the credential related to the first network to access a service of the first network.

Figure 4:
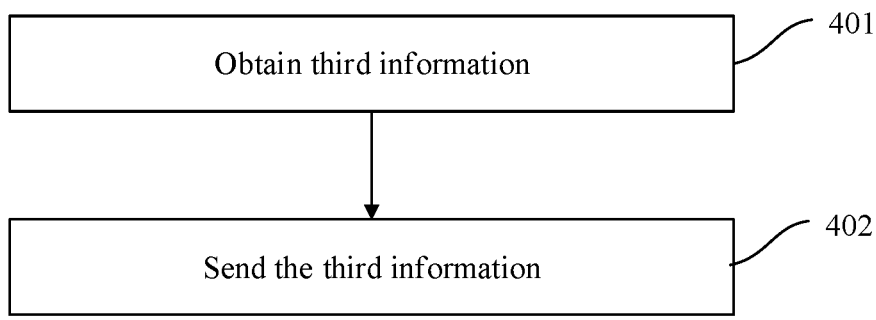
FIG. 4 is a flowchart of another access control method according to an embodiment of the present invention.

Referring to FIG. 4, FIG. 4 is another access control method according to an embodiment of the present invention. The method is applied to a third communications device. The third communications device includes but is not limited to one of the following: an AF, a second authentication server, or a device related to a vendor of a first communications device. As shown in FIG. 4, the following steps are included:

Step 401: Obtain third information.
Step 402: Send the third information.

The third information includes at least one of the following:
mapping information between index information of a second authentication server and address-related information of the second authentication server; and
the address-related information of the second authentication server.

In an implementation, for the third information, reference may be made to the third information in the embodiment shown in FIG. 3; and details are not repeated herein.

In an implementation, the mapping information between the index information of the second authentication server and the address-related information of the second authentication server may be used to determine the address-related information of the second authentication server.

In an implementation, the sending the third information may be sending the third information to a second communications device.

Optionally, the sending information related to the second authentication server includes:
in a case that a third condition is satisfied, sending the information related to the second authentication server; where
the third condition includes at least one of the following:
mutual authentication between the third communications device and the second authentication server is successful; and
mutual authentication between the third communications device and a first network is successful.

Optionally, the third communications device is a communications device outside the first network.

In an implementation, the third communications device and the second authentication server may be mutually authenticated in advance.

In an implementation, the third communications device and the first network is mutually authenticated.

In this embodiment, the third information is sent, so that the second communications device obtains the third information.

In this way, the first network can select the second authentication server to perform authentication on the first communications device, so as to support authentication on the terminal when the terminal with no credential related to the first network accesses the first network. This avoids security attacks on the first network by counterfeit and illegitimate terminals.

Referring to FIG. 5, FIG. 5 is another access control method according to an embodiment of the present invention. The method is applied to a fourth communications device. The fourth communications device includes but is not limited to a terminal. As shown in FIG. 5, the following steps are included:

Step 501: Obtain second information.
Step 502: Perform a second operation based on the second information.

The second information includes at least one of the following:
a first terminal routing policy (for example, URSP);
default DNN information being left blank;
default slice information being left blank;

related information for establishing a first data channel;
second indication information;
third indication information;
address-related information of a first server; and
address-related information of a second authentication server.

The first server is a server capable of configuring a credential related to a first network.

The first terminal routing policy is used for accessing the first server or a credential download application.

The first data channel is a data channel in the first network.

The second indication information is used to indicate at least one of the following:
  the first data channel is used for interaction between a first communications device and the first server;
  the first data channel is used by the first communications device to request the credential related to the first network; and
  the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

In an implementation, for the second information, reference may be made to the second information in the embodiment shown in FIG. 5; and details are not repeated herein.

In an implementation, the obtaining the second information may be obtaining the second information from the first network.

Optionally, the second operation includes at least one of the following:
  establishing a first data channel, where the first data channel satisfies at least one of the following: the first data channel is used for interaction between the first communications device and the first server; the first data channel is used by the first communications device to request a credential related to the first network; and the first data channel is used for configuring, for the first communications device, the credential related to the first network;
  requesting the first server to configure the credential related to the first network;
  requesting the second authentication server to configure the credential related to the first network;
  declining an access request or a data sending request for a target not being the first server and/or a credential download application at an application layer; and
  allowing an access request or a data sending request only for a target being the first server and/or the credential download application.

In an implementation, the related information for establishing the first data channel (the data channel is, for example, a PDU session) includes at least one of the following:
  DNN, slice information (for example, NSSAI), SSC mode, and data channel type (for example, PDU session type).

In an implementation, the first data channel is a data channel in the first network and is a data channel used for downloading a credential related to the first network.

In an implementation, establishment of the first data channel is requested based on related information for establishing the first data channel and/or the second indication information.

Based on the address-related information of the first server, the first server is requested to configure the credential related to the first network.

Based on the address-related information of the second authentication server, the second authentication server is requested to configure the credential related to the first network. It is not difficult to understand that, according to the request, the second authentication server first performs authentication on the fourth communications device, and after the authentication is successful, requests the first server to configure, for the fourth communications device, the credential related to the first network.

In this embodiment, the second information is obtained, and the second operation is performed based on the second information. In this way, necessary configuration can be obtained when the terminal without the credential related to the first network accesses the first network, so that a legitimate terminal obtains the credential related to the first network to access a service of the first network.

Figure 6:
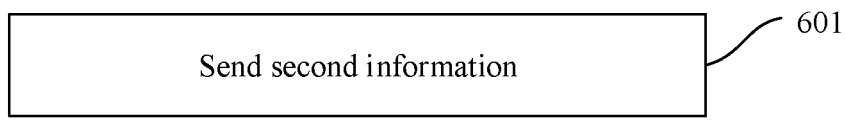
FIG. 6 is a flowchart of another access control method according to an embodiment of the present invention.

Referring to FIG. 6, FIG. 6 is another access control method according to an embodiment of the present invention. The method is applied to a fifth communications device. The fifth communications device includes but is not limited to one of the following: a communications device in a first network, for example, an AMF. As shown in FIG. 6, the following steps are included:

Step 601: Send second information, where the second information includes at least one of the following:
  a first terminal routing policy (for example, URSP);
  default DNN information being left blank;
  default slice information being left blank;
  related information for establishing a first data channel;
  second indication information;
  third indication information;
  address-related information of a first server; and
  address-related information of a second authentication server.

The first server is a server capable of configuring a credential related to a first network.

The first terminal routing policy is used for accessing the first server or a credential download application.

The first data channel is a data channel in the first network.

The second indication information is used to indicate at least one of the following:
  the first data channel is used for interaction between a first communications device and the first server;
  the first data channel is used by the first communications device to request the credential related to the first network; and
  the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

Optionally, before the step of sending second information, an operation related to determining of the second information is performed.

The operation related to determining of the second information includes:

an operation of determining the first terminal routing policy;

setting default DNN information to null or skipping configuring default DNN information; and setting default slice information to null or skipping configuring default (NSSAI) slice information.

It is not difficult to understand that the first network does not allow the terminal to access services other than that of the first server. A default DNN is used when a DNN in a corresponding routing policy is not available for accessing an application or an access target by the terminal, and the default DNN is selected for establishing a data channel to access the application or the access target. Therefore, if the default DNN is not configured, the terminal is not allowed to initiate other services. The default slice information is used when slice information of a corresponding routing policy is not available for accessing an application or an access target by the terminal, and the default slice information is selected for establishing a data channel to access the application or the access target. Therefore, if the default slice information is not configured, the terminal is not allowed to initiate other services.

Optionally, the operation of determining the first terminal routing policy includes at least one of the following:

setting application description in the first terminal routing policy to be address-related information of the first server (for example, setting the application description to be an IP triplet of the first server or an FQDN of the first server), setting the application description in the first terminal routing policy to be credential download application information (for example, setting the application description to be a credential download application), and setting the application description in the first terminal routing policy to be a DNN of the restricted service.

The credential download application is used to request the first server to configure the credential related to the first network.

In an implementation, the credential related to the first network may be configured by using control-plane signaling. It is not difficult to understand that in this case, only control plane being allowed while user plane being prohibited may be specified by using the third indication information.

Optionally, in a case that a fourth condition is satisfied, an operation related to determining of the second information is performed and/or the second information is sent.

The fourth condition may include:

a terminal accesses a restricted service of the first network or receives first indication information sent by the terminal;

it is determined that the terminal has passed initial authentication, or it is determined that the terminal has been authenticated successfully by the second authentication server;

it is determined that the first communications device is a non-counterfeit device;

it is determined that the terminal is a legitimate device in the first network or that the terminal is a communications device in a legitimate device list; and it is determined that configuring, for the terminal, a credential related to the first network is allowed.

Optionally, the second information is sent to the terminal.

In this way, necessary configuration can be obtained when the terminal without the credential related to the first network accesses the first network, so that a legitimate terminal obtains the credential related to the first network to access a service of the first network. The following describes the access control method in the embodiments of the present invention with reference to specific application scenarios.

Application Scenario 1 in the Embodiments of the Present Invention

Figure 7:
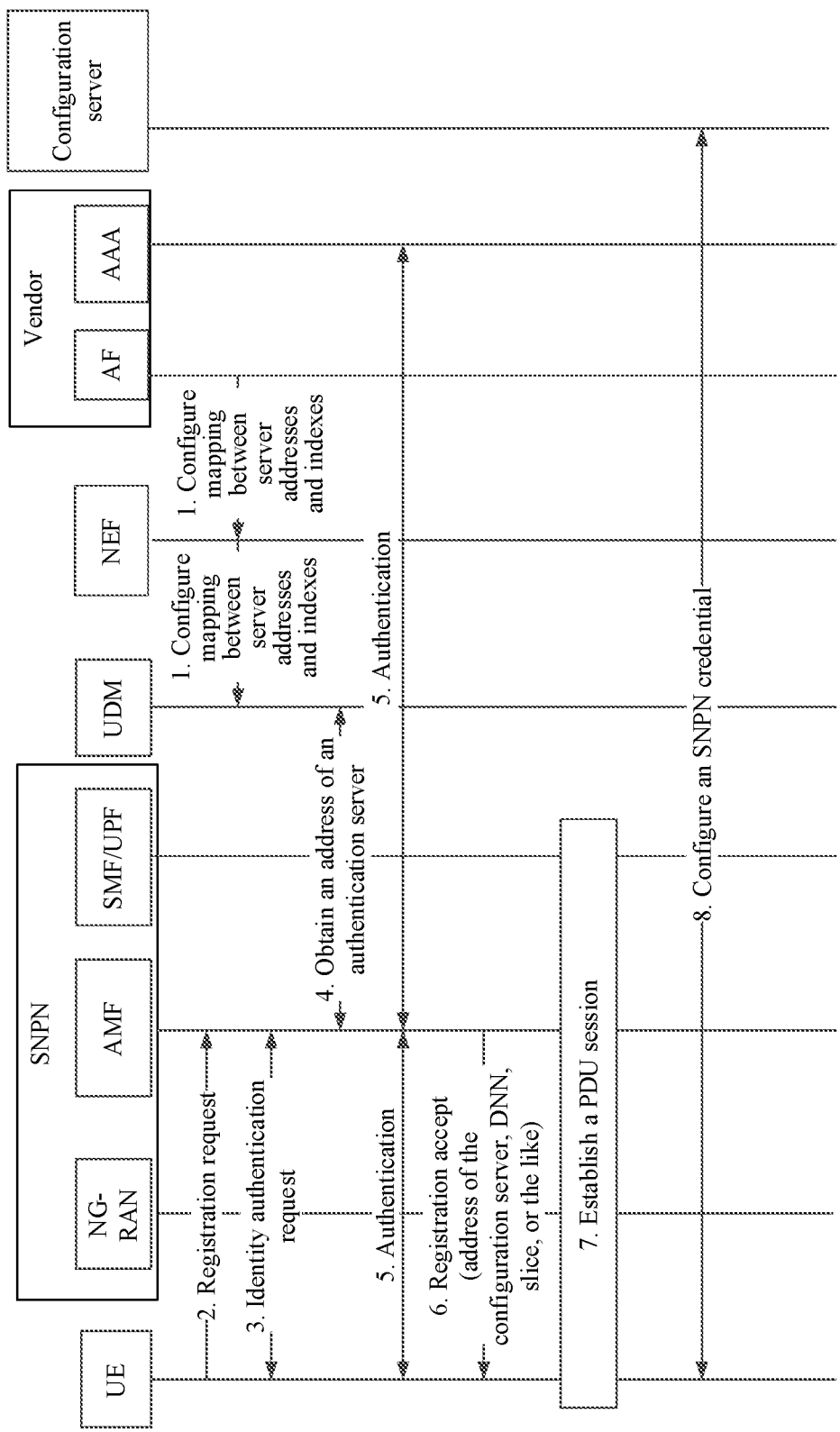
FIG. 7 is a schematic diagram of an access control method according to an embodiment of the present invention.

The application scenario 1 in the embodiments of the present invention mainly describes access control between UE, an SNPN, and a second authentication server, which includes the following steps as shown in FIG. 7.

Step 1: An AF sends third information (information related to the second authentication server) to a first network.

The third information includes at least one of the following: mapping information between index information of the second authentication server and address information of the second authentication server, and the address information of the second authentication server.

Based on the index information of the second authentication server in the mapping information between the index information of the second authentication server and the address information of the second authentication server, address information of the second authentication server corresponding to the index information of the second authentication server may be indexed.

The AF may be an AF from a vendor of a terminal.

The AF may send the information to a UDM of the first network through an NEF of the first network.

Step 2: The UE initiates a registration request to an AMF in the first network.

Optionally, the registration request includes the index information of the second authentication server, or provides vendor information of the terminal.

The index information of the second authentication server may include at least one of the following: address information (such as IP, FQDN, or URL) of the second authentication server and identification information of a terminal vendor to which the second authentication server belongs.

Step 3 (optional): The AMF sends an identity request to the UE, and an identity type is set to be at least one of the following: terminal vendor (such as Vendor ID) and other related types, index information of the second authentication server, and address information of the second authentication server.

The UE includes the index information of the second authentication server, such as identification information of a UE vendor, in an identity response.

Step 4 (optional): The AMF sends the index information of the second authentication server to the UDM, and obtains the address information of the second authentication server.

Based on the mapping information between the index information of the second authentication server and the address information of the second authentication server, and the index information of the second authentication server, the UDM may determine the address information of the second authentication server.

The UDM sends the address information of the second authentication server to the AMF.

In an implementation, step 4 uses a non-UE related signaling process.

Step 5: The AMF performs a first operation, and the first operation includes at least one of the following:

determine an address of the second authentication server;

requesting the second authentication server to perform authentication (Authentication/Security) on the terminal; and determining whether the terminal is a legitimate terminal in the first network or a terminal for which configuring a credential related to the first network is allowed.

In an implementation, the mapping information between the index information of the second authentication server and the address information of the second authentication server is obtained from the AF.

In another implementation, the index information of the second authentication server is obtained from the terminal.

Further, when a condition for a legitimate terminal is satisfied, it can be determined that the terminal is a legal terminal of the first network. The condition for the legitimate terminal may include at least one of the following: the terminal being authenticated successfully by the second authentication server, and the terminal being a terminal in the legitimate terminal list. The legitimate terminal may be a terminal for which configuring a credential related to the first network is allowed.

Step 6: When it is determined that the terminal is a legitimate terminal in the first network, send second information and a registration accept message to the terminal.

The second information is described in the embodiment of FIG. 5. For example, the second information includes at least one of the following:

information (for example, DNN, slice information, or SSC) related to PDU session establishment for a restricted service; and address-related information of a first server.

In an implementation, the registration accept message that is sent includes: address-related information of the first server.

Step 7: The UE establishes a session with the SNPN.

Step 8: An SNPN credential configuration request and configuration response are transmitted between the UE and a configuration server.

Application Scenario 2 in the Embodiments of the Present Invention

Figure 8:
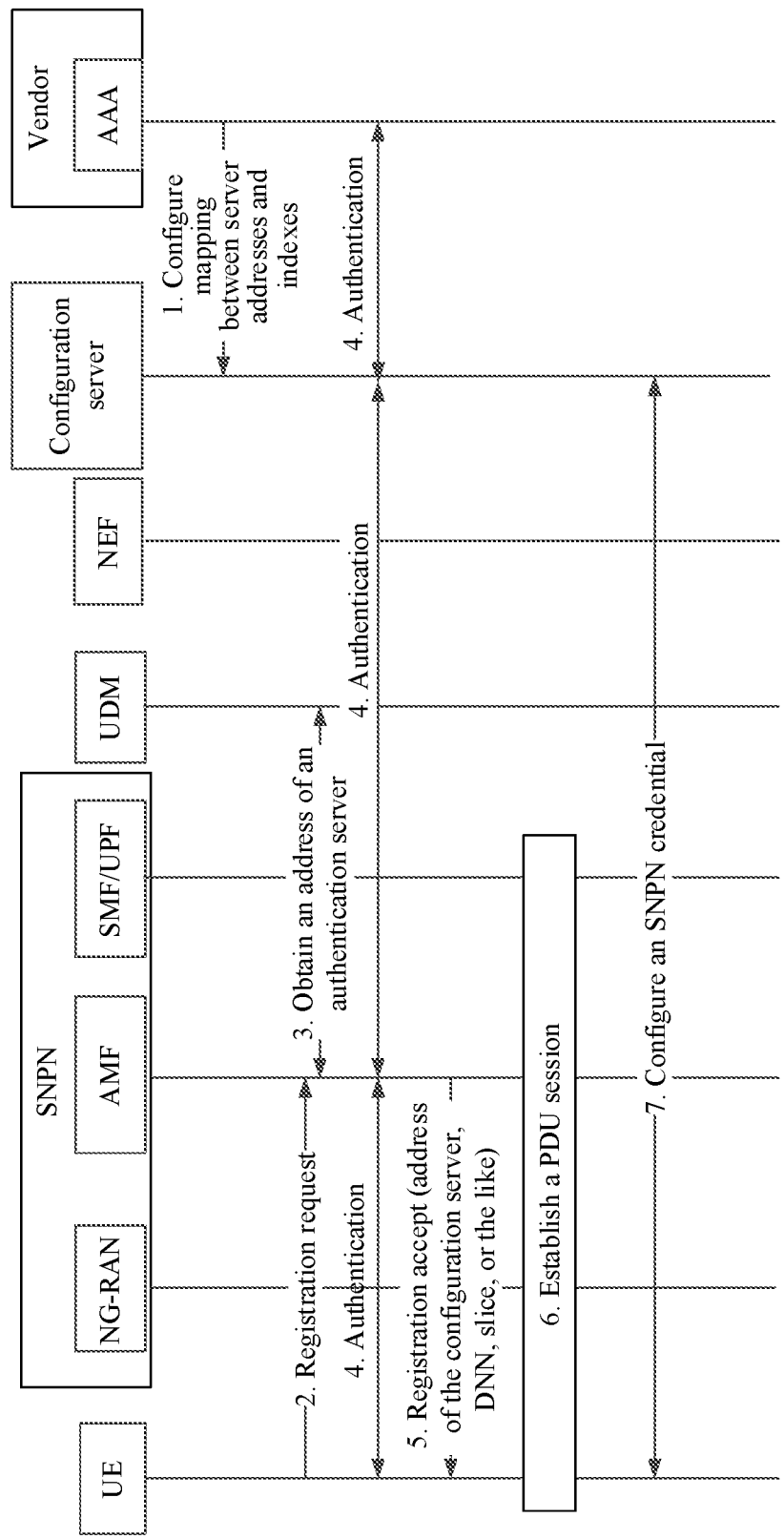
FIG. 8 is a schematic diagram of another access control method according to an embodiment of the present invention.

The application scenario 2 in the embodiments of the present invention mainly describes access control between UE, an SNPN, a configuration server, and a second authentication server, which includes the following steps as shown in FIG. 8:

Step 1 (optional): The configuration server obtains third information (or referred to as information related to the second authentication server).

The information related to the second authentication server includes at least one of the following: mapping information between index information of the second authentication server and address information of the second authentication server, and the address information of the second authentication server.

Based on the index information of the second authentication server in the mapping information between the index information of the second authentication server and the address information of the second authentication server, address information of the second authentication server corresponding to the index information of the second authentication server may be indexed.

Step 2: The UE initiates an access request to an AMF in the first network, and sends the index information of the second authentication server.

The index information of the second authentication server may include at least one of the following: address information (such as IP, FQDN, or URL) of the second authentication server and identification information of a terminal vendor to which the second authentication server belongs.

Step 3 (optional): The AMF sends the index information of the second authentication server to a UDM, and obtains the address information of the second authentication server.

Based on the mapping information between the index information of the second authentication server and the address information of the second authentication server, and the index information of the second authentication server, the UDM may determine the address information of the second authentication server.

The UDM sends the address information of the second authentication server to the AMF.

In an implementation, step 4 uses a non-UE related signaling process.

Step 4: The AMF performs at least one of the following operations:

determining an address of the second authentication server;

requesting the configuration server of the first network to perform authentication on the terminal; and sending the address information of the second authentication server or the index information of the second authentication server to the configuration server of the first network.

The configuration server performs at least one of the following operations:

determining an address of the second authentication server; and requesting the second configuration server to perform authentication on the terminal.

After the authentication step is completed, the AMF performs at least one of the following operations:

determining whether the terminal is a legitimate terminal in the first network or a terminal for which configuring a credential related to the first network is allowed; and determining whether registration of the terminal is allowed.

Further, when a condition for a legitimate terminal is satisfied, it can be determined that the terminal is a legal terminal of the first network. The condition for the legitimate terminal may include at least one of the following: the terminal being authenticated successfully by the second authentication server, and the terminal being a terminal in the legitimate terminal list. The legitimate terminal may be a terminal for which configuring a credential related to the first network is allowed.

Step 5: When it is determined that the terminal is a legitimate terminal in the first network, send second information and a registration accept message to the terminal.

The second information is described in the embodiment of FIG. 5. For example, the second information includes at least one of the following:

information (for example, DNN, slice information, or SSC) related to PDU session establishment for a restricted service; and address-related information of a first server.

In an implementation, the registration accept message that is sent includes: address-related information of the first server.

Step 6: The UE establishes a session with the SNPN.

Step 7: An SNPN credential configuration is transmitted between the UE and the configuration server.

Application Scenario 3 in the Embodiments of the Present Invention

Figure 9:
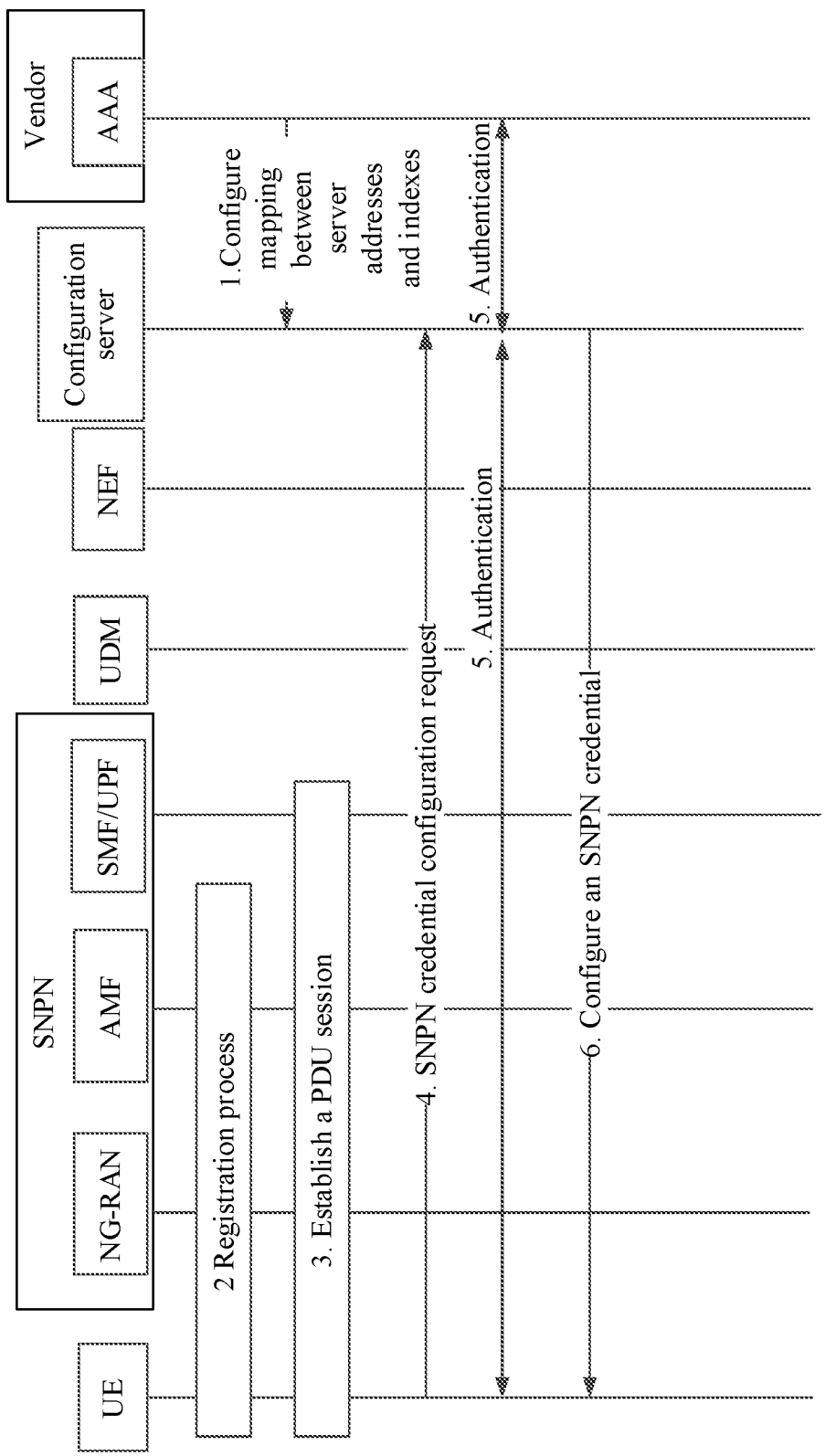
FIG. 9 is a schematic diagram of another access control method according to an embodiment of the present invention.

The application scenario 3 in the embodiments of the present invention mainly describes access control between UE, a configuration server, and an authentication server, which includes the following steps as shown in FIG. 9:

Step 1 (optional): The configuration server obtains related information of a second authentication server.

The information related to the second authentication server includes at least one of the following: mapping information between index information of the second authentication server and address information of the second authentication server, and the address information of the second authentication server.

Based on the index information of the second authentication server in the mapping information between the index information of the second authentication server and the address information of the second authentication server, address information of the second authentication server corresponding to the index information of the second authentication server may be indexed.

Step 2: The UE initiates a registration request to an AMF in a first network.

The AMF sends second information and a registration accept message to the terminal.

The second information includes at least one of the following:
information (for example, DNN, slice information, or SSC) related to PDU session establishment for a restricted service; and
address-related information of a first server.

In an implementation, the registration accept message that is sent includes: address-related information of the first server (for example, the configuration server).

Step 3: The UE establishes a PDU session with the first network. The PDU session is a PDU session of a restricted service.

In another optional manner, an SMF sends the second information to the terminal.

Step 4: The UE initiates a configuration request to the configuration server. The UE sends the index information of the second authentication server to the configuration server.

The index information of the second authentication server may include at least one of the following: address information (such as IP, FQDN, or URL) of the second authentication server and identification information of a terminal vendor to which the second authentication server belongs.

Step 5: The configuration server performs at least one of the following operations:
determining an address of the second authentication server; and
requesting the second configuration server to perform authentication on the terminal.

After the authentication step is completed, the configuration server performs at least one of the following operations:
determining whether the terminal is a legitimate terminal in the first network or a terminal for which configuring a credential related to the first network is allowed.

Further, when a condition for a legitimate terminal is satisfied, it can be determined that the terminal is a legal terminal of the first network. The condition for the legitimate terminal may include at least one of the following: the terminal being authenticated successfully by the second authentication server, and the terminal being a terminal in the legitimate terminal list. The legitimate terminal may be a terminal for which configuring a credential related to the first network is allowed.

Step 6: When it is determined that the terminal is a legitimate terminal in the first network, configure, for the terminal, a credential related to the first network.

Application Scenario 4 in the Embodiments of the Present Invention

Figure 10:
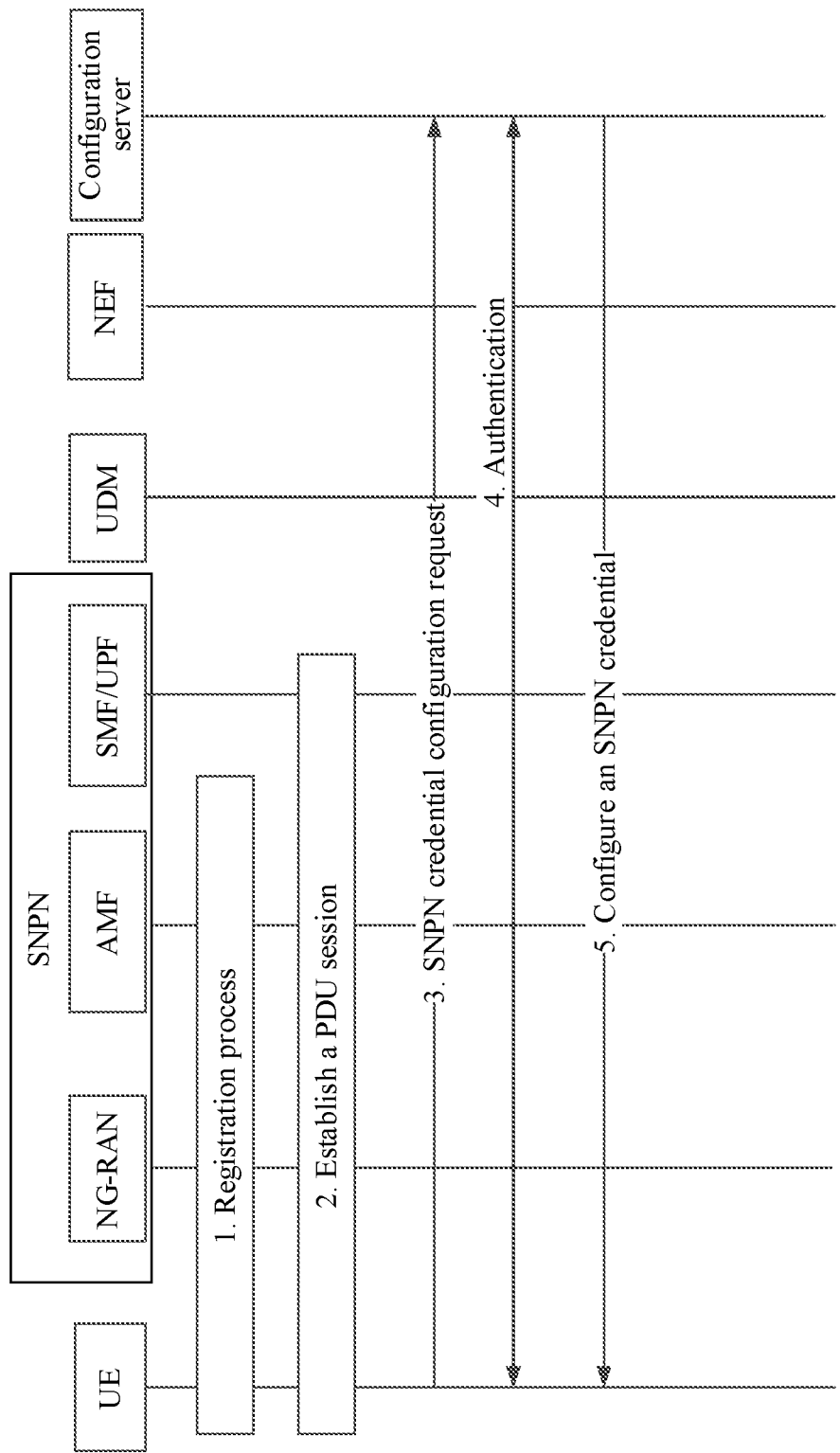
FIG. 10 is a schematic diagram of another access control method according to an embodiment of the present invention.

The application scenario 4 in the embodiments of the present invention mainly describes access control between UE and a configuration server, which includes the following steps as shown in FIG. 10:

Step 1: The UE initiates a registration request to an AMF in a first network.

The AMF sends second information and a registration accept message to the terminal.

The second information is described in the embodiment of FIG. 5. For example, the second information includes at least one of the following:
information (for example, DNN, slice information, or SSC) related to PDU session establishment for a restricted service; and
address-related information of a first server.

In an implementation, the registration accept message that is sent includes: address-related information of the first server (for example, the configuration server).

Step 2: The UE establishes a PDU session with the first network. The PDU session is a PDU session of a restricted service.

In another optional manner, an SMF sends the second information to the terminal.

Step 3: The UE initiates a configuration request to the configuration server.

Step 4: The configuration server performs authentication on the terminal.

After the authentication step is completed, the configuration server performs at least one of the following operations:
determining whether the terminal is a legitimate terminal in the first network or a terminal for which configuring a credential related to the first network is allowed.

Further, when a condition for a legitimate terminal is satisfied, it can be determined that the terminal is a legal terminal of the first network. The condition for the legitimate terminal may include at least one of the following: the terminal being authenticated successfully by the second authentication server, and the terminal being a terminal in the legitimate terminal list. The legitimate terminal may be a terminal for which configuring a credential related to the first network is allowed.

Step 5: When it is determined that the terminal is a legitimate terminal in the first network, configure, for the terminal, a credential related to the first network.

In this embodiment of the present invention, the following may be implemented:

When being just delivered from a factory to access an SNPN or accessing a configuration server of the SNPN, the UE provides related information identifying a UE vendor (vendor). After receiving such information, the SNPN selects a second authentication server (such as AAA) of the UE vendor, for authentication on the UE.

The SNPN may define a new identity type to obtain the index information of the second authentication server, such as a vendor of the UE.

The SNPN sends address-related information of the configuration server to the UE, which is used by the UE to initiate a configuration request to configuration server on a user plane; or the SNPN requests the configuration server on a control plane for a credential related to the first network for the UE.

In this embodiment of the present invention, when the UE without a credential of the SNPN accesses the SNPN, authentication and configuration for the UE are performed, to avoid security attacks from counterfeit and illegitimate UEs; in addition, configuring a credential of the SNPN for the UE is supported.

Figure 11:
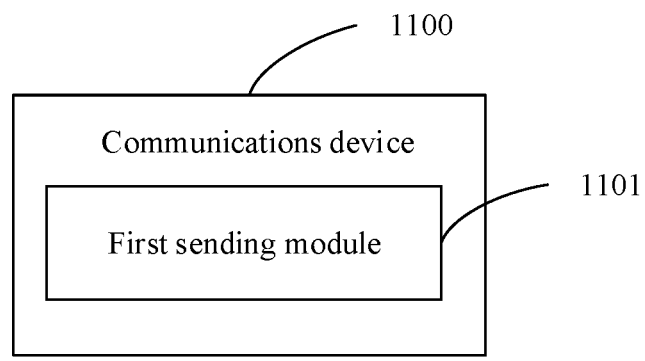
FIG. 11 is a structural diagram of a communications device according to the present invention.

Referring to FIG. 11, FIG. 11 is a structural diagram of a communications device according to an embodiment of the present invention. The communications device is a first communications device. As shown in FIG. 11, the communications device 1100 includes:

a first sending module 1101, configured to send first information and/or first indication information to a first target end, where the first information includes at least one of the following:
index information of a second authentication server;
vendor-related information of the first communications device; and
address-related information of the second authentication server.

The first indication information is used for requesting to obtain a credential related to a first network, or used to indicate that an access type is a restricted service.

Optionally, the sending first information includes:
in a case that a first condition is satisfied, sending the first information; where
the first condition includes at least one of the following:
the first communications device has a second credential;
the first communications device has no credential related to the first network;
the first communications device requests to access the first network;
the first communications device requests to access a restricted service of the first network;
the first communications device requests to obtain a credential related to the first network;
at least one piece of the first information has been obtained;
request information for the first information has been obtained;
information that the first network supports the restricted service has been obtained;
information that the first network supports and/or requests authentication for the restricted service has been obtained;
information that the first network supports and/or requests authentication on the first communications device has been obtained; and
information that the first network supports configuring, for the first communications device, the credential related to the first network has been obtained.

Optionally, the request information for the first information includes at least one of the following:
first request information, where the first request information is used to request vendor information of the first communications device;
second request information, where the second request information is used to request index information of the second authentication server; and
third request information, where the third request information is used to request address-related information of the second authentication server.

Optionally, before the step of sending first information, the communications device further includes:
a second sending module, configured to send an access request and/or sending the first indication information to the first target end.

The first indication information is used for requesting to obtain the credential related to the first network, or used to indicate that the access type is a restricted service.

Optionally, the communications device further includes:
a receiving module, configured to receive at least one of the following information that is sent by the first target end:
request information for the first information;
information that the first network supports the restricted service;
information that the first network supports and/or requests authentication for the restricted service;
information that the first network supports and/or requests authentication on the first communications device; and
information that the first network supports configuring, for the first communications device, the credential related to the first network.

Optionally, the communications device further includes:
an obtaining module, configured to obtain second information; where the second information includes at least one of the following:
a first terminal routing policy;
default DNN information being left blank;
default slice information being left blank;
related information for establishing a first data channel;
second indication information;
third indication information;
address-related information of a first server; and
address-related information of the second authentication server.

The first server is a server capable of configuring the credential related to the first network;
the first terminal routing policy is used for accessing the first server or a credential download application; and
the first data channel is a data channel in the first network.

The second indication information is used to indicate at least one of the following:
the first data channel is used for interaction between the first communications device and the first server;
the first data channel is used by the first communications device to request the credential related to the first network; and
the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

The communications device 1100 is capable of implementing the processes implemented by the first communications device in the method embodiments of the present invention, with the same beneficial effects achieved. To avoid repetition, details are not described herein again.

Figure 12:
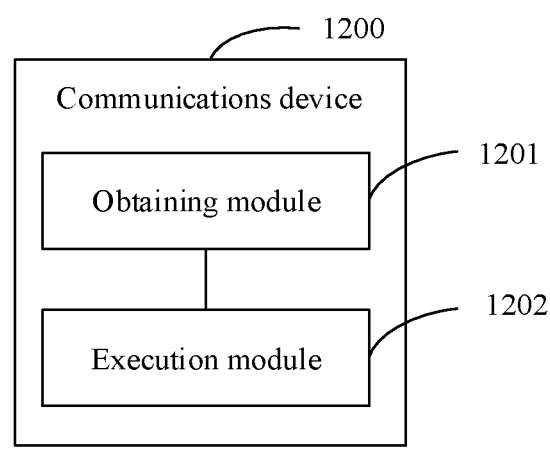
FIG. 12 is a structural diagram of another communications device according to the present invention.

Referring to FIG. 12, an embodiment of the present invention provides another communications device. The communications device is a second communications device. As shown in FIG. 12, the communications device 1200 includes:

an obtaining module 1201, configured to obtain at least one of first information, first indication information, a legitimate device list, and third information; and an execution module 1202, configured to perform a first operation based on the first information, the first indication information, the legitimate device list, and the third information.

The first information includes at least one of the following: index information of a second authentication server, vendor-related information of a first communications device, and address-related information of the second authentication server.

The first indication information is used for requesting to obtain a credential related to a first network, or used to indicate that an access type is a restricted service.

The third information includes at least one of the following:

mapping information between the index information of the second authentication server and the address-related information of the second authentication server; and the address-related information of the second authentication server.

Optionally, the first operation includes at least one of the following:

determining the second authentication server;

determining to request the second authentication server to perform authentication on the first communications device;

requesting the second authentication server to perform authentication on the first communications device;

requesting a first server to perform authentication on the first communications device;

sending the first information to the first server;

determining whether the first communications device is a legitimate device in the first network;

determining whether configuring, for the first communications device, the credential related to the first network is allowed; and determining whether accepting a registration request of the first communications device by the first network is allowed.

The first server is a server capable of configuring, for the first communications device, the credential related to the first network.

Optionally, the step of determining the second authentication server includes but is not limited to at least one of the following:

determining the second authentication server based on the index information of the second authentication server in the first information and the mapping information between the index information of the second authentication server and the address-related information of the second authentication server in the third information;

determining the second authentication server based on the vendor-related information of the first communications device in the first information and the mapping information between the index information of the second authentication server and the address-related information of the second authentication server in the third information;

determining the second authentication server based on the address-related information of the second authentication server in the first information and/or the address-related information of the second authentication server in the third information; and determining the second authentication server based on the first indication information and/or the address-related information of the second authentication server in the third information;

and/or, the step of determining to request the second authentication server to perform authentication on the first communications device includes but is not limited to at least one of the following:

determining, based on the first indication information and/or the first information, to request the second authentication server to perform authentication on the first communications device; and determining, based on the first indication information and/or the address-related information of the second authentication server in the third information, to request the second authentication server to perform authentication on the first communications device.

Optionally, in a case that the first communications device satisfies a second condition, the first communications device is determined to be a legitimate device in the first network.

The second condition includes at least one of the following:

the first communications device is authenticated successfully by the second authentication server; and the first communications device is a communications device in the legitimate device list.

Optionally, the legitimate device list includes at least one of the following:

a legitimate communications device, not yet configured with a credential related to the first network, in the first network; and a communications device for which configuring a credential related to the first network is allowed.

Optionally, the communications device further includes:

a receiving module, configured to receive an access request and/or first indication information from the first communications device; where the first indication information is used for requesting to obtain the credential related to the first network, or used to indicate that the access type is a restricted service; and a first sending module, configured to send request information for the first information based on the access request and/or the first indication information.

Optionally, the request information for the first information includes at least one of the following:

first request information, where the first request information is used to request vendor information of the first communications device;

second request information, where the second request information is used to request index information of the second authentication server; and third request information, where the third request information is used to request address-related information of the second authentication server.

Optionally, the communications device further includes:

a second sending module, configured to: send second information in a case that the first communications device is determined to be a legitimate device in the first network, where the second information includes at least one of the following:

related information for establishing a first data channel;

second indication information; and
address-related information of a first server.

The first server is a server capable of configuring the credential related to the first network.

The first data channel is a data channel in the first network.

The second indication information is used to indicate at least one of the following:
- the first data channel is used for interaction between the first communications device and the first server;
- the first data channel is used by the first communications device to request the credential related to the first network; and
- the first data channel is used for configuring, for the first communications device, the credential related to the first network.

The communications device 1200 is capable of implementing the processes implemented by the second communications device in the method embodiments of the present invention, with the same beneficial effects achieved. To avoid repetition, details are not described herein again.

Figure 13:
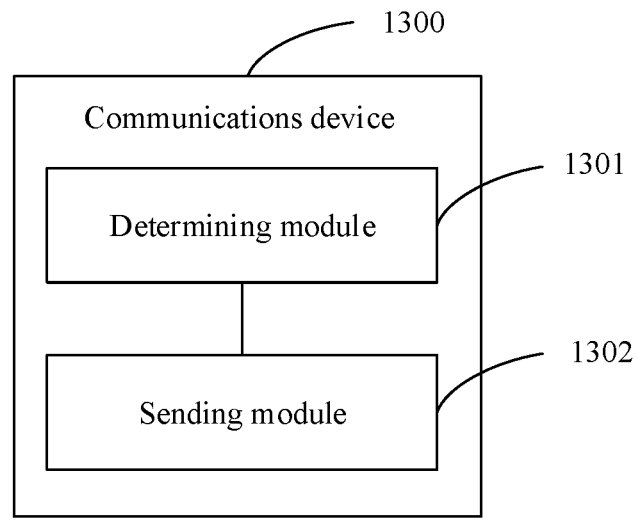
FIG. 13 is a structural diagram of another communications device according to the present invention.

Referring to FIG. 13, an embodiment of the present invention provides another communications device. The communications device is a third communications device. As shown in FIG. 13, the communications device 1300 includes:
- a determining module 1301, configured to determine third information; and
- a sending module 1302, configured to send the third information; where the third information includes at least one of the following:
- mapping information between index information of a second authentication server and address-related information of the second authentication server; and
- the address-related information of the second authentication server.

Optionally, the sending information related to the second authentication server includes:
- in a case that a third condition is satisfied, sending the information related to the second authentication server; where the third condition includes at least one of the following:
- mutual authentication between the third communications device and the second authentication server is successful; and
- mutual authentication between the third communications device and a first network is successful.

The communications device 1300 is capable of implementing the processes implemented by the third communications device in the method embodiments of the present invention, with the same beneficial effects achieved. To avoid repetition, details are not described herein again.

Figure 14:
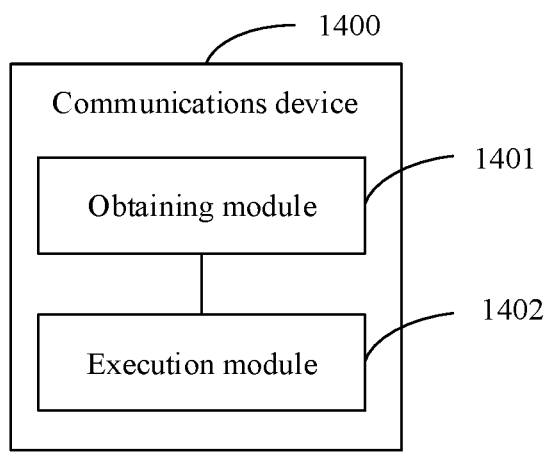
FIG. 14 is a structural diagram of another communications device according to the present invention.

Referring to FIG. 14, an embodiment of the present invention provides another communications device. The communications device is a fourth communications device. As shown in FIG. 14, the communications device 1400 includes:
- an obtaining module 1401, configured to obtain second information; and
- an execution module 1402, configured to perform a second operation based on the second information.

The second information includes at least one of the following:
- a first terminal routing policy;
- default DNN information being left blank;
- default slice information being left blank;
- related information for establishing a first data channel;
- second indication information;
- third indication information;
- address-related information of a first server; and
- address-related information of a second authentication server.

The first server is a server capable of configuring a credential related to a first network.

The first terminal routing policy is used for accessing the first server or a credential download application.

The first data channel is a data channel in the first network.

The second indication information is used to indicate at least one of the following:
- the first data channel is used for interaction between a first communications device and the first server;
- the first data channel is used by the first communications device to request the credential related to the first network; and
- the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

Optionally, the second operation includes at least one of the following:
- establishing a first data channel, where the first data channel satisfies at least one of the following: the first data channel is used for interaction between the first communications device and the first server; the first data channel is used by the first communications device to request a credential related to the first network; and the first data channel is used for configuring, for the first communications device, the credential related to the first network;
- requesting the first server to configure the credential related to the first network;
- requesting the second authentication server to configure the credential related to the first network;
- declining an access request or a data sending request for a target not being the first server and/or a credential download application at an application layer; and
- allowing an access request or a data sending request only for a target being the first server and/or the credential download application.

The communications device 1400 is capable of implementing the processes implemented by the fourth communications device in the method embodiments of the present invention, with the same beneficial effects achieved. To avoid repetition, details are not described herein again.

Figure 15:
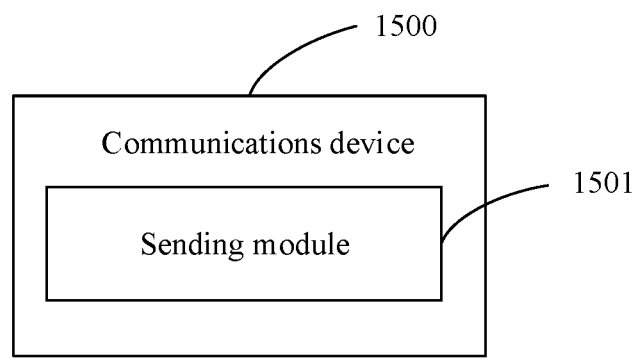
FIG. 15 is a structural diagram of another communications device according to the present invention.

Referring to FIG. 15, an embodiment of the present invention provides another communications device. The communications device is a fifth communications device. As shown in FIG. 15, the communications device 1500 includes:
- a sending module 1501, configured to send second information; where the second information includes at least one of the following:
- a first terminal routing policy;
- default DNN information being left blank;
- default slice information being left blank;
- related information for establishing a first data channel;
- second indication information;
- third indication information;

address-related information of a first server; and
address-related information of a second authentication server.

The first server is a server capable of configuring the credential related to the first network.

The first terminal routing policy is used for accessing the first server or a credential download application.

The first data channel is a data channel in the first network.

The second indication information is used to indicate at least one of the following:
  the first data channel is used for interaction between a first communications device and the first server;
  the first data channel is used by the first communications device to request the credential related to the first network; and
  the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

Optionally, in a case that a fourth condition is satisfied, an operation related to determining of the second information is performed and/or the second information is sent.

The fourth condition includes:
  a terminal accesses a restricted service of the first network or receives first indication information sent by the terminal;
  it is determined that the terminal has passed initial authentication, or it is determined that the terminal has been authenticated successfully by the second authentication server;
  it is determined that the first communications device is a non-counterfeit device;
  it is determined that the terminal is a legitimate device in the first network or that the terminal is a communications device in a legitimate device list; and
  it is determined that configuring, for the terminal, a credential related to the first network is allowed.

The communications device 1500 is capable of implementing the processes implemented by the third communications device in the method embodiments of the present invention, with the same beneficial effects achieved. To avoid repetition, details are not described herein again.

Figure 16:
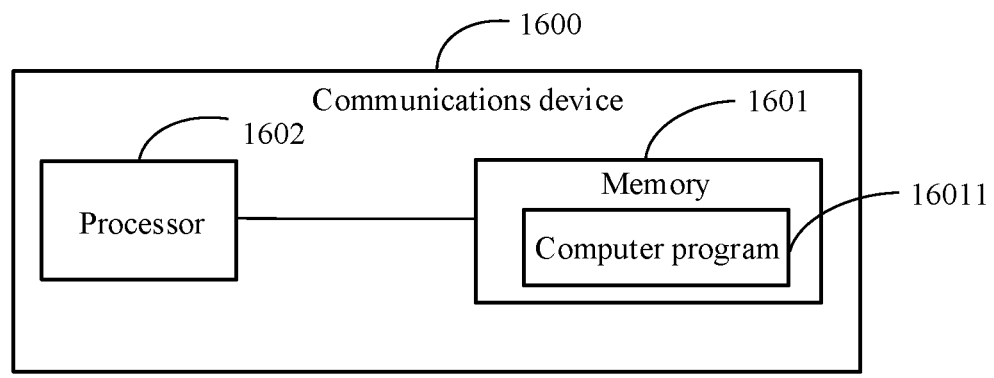
FIG. 16 is a structural diagram of another communications device according to the present invention.

Referring to FIG. 16, FIG. 16 is a fifth structural diagram of a communications device according to an embodiment of the present invention. As shown in FIG. 16, the communications device 1600 includes a memory 1601, a processor 1602, and a computer program 16011 stored on the memory 1601 and capable of running on the processor 1602.

When the communications device 1600 acts as the first communications device in the foregoing method embodiment, the following steps are implemented when the computer program 16011 is executed by the processor 1602:
  sending first information and/or first indication information to a first target end, where the first information includes at least one of the following:
  index information of a second authentication server;
  vendor-related information of the first communications device; and
  the address-related information of the second authentication server.

The first indication information is used for requesting to obtain a credential related to a first network, or used to indicate that an access type is a restricted service.

Optionally, the sending first information includes:
  in a case that a first condition is satisfied, sending the first information; where
  the first condition includes at least one of the following:
  the first communications device has a second credential;
  the first communications device has no credential related to the first network;
  the first communications device requests to access the first network;
  the first communications device requests to access a restricted service of the first network;
  the first communications device requests to obtain a credential related to the first network;
  at least one piece of the first information has been obtained;
  request information for the first information has been obtained;
  information that the first network supports the restricted service has been obtained;
  information that the first network supports and/or requests authentication for the restricted service has been obtained;
  information that the first network supports and/or requests authentication on the first communications device has been obtained; and
  information that the first network supports configuring, for the first communications device, the credential related to the first network has been obtained.

Optionally, the request information for the first information includes at least one of the following:
  first request information, where the first request information is used to request vendor information of the first communications device;
  second request information, where the second request information is used to request index information of the second authentication server; and
  third request information, where the third request information is used to request address-related information of the second authentication server.

Optionally, before the step of sending the first information, when the computer program 16011 is executed by the processor 1602, the following steps are further implemented:
  sending an access request and/or sending the first indication information to the first target end.

The first indication information is used for requesting to obtain a credential related to a first network, or used to indicate that an access type is a restricted service.

Optionally, before the step of sending the first information, when the computer program 16011 is executed by the processor 1602, the following steps are further implemented:
  receiving at least one of the following information that is sent by the first target end:
  request information for the first information;
  request information for the first information;
  information that the first network supports the restricted service;
  information that the first network supports and/or requests authentication for the restricted service;
  information that the first network supports and/or requests authentication on the first communications device; and information that the first network supports configuring, for the first communications device, the credential related to the first network.

Optionally, when the computer program 16011 is executed by the processor 1602, the following steps are further implemented:
obtaining second information, where the second information includes at least one of the following:
a first terminal routing policy;
default DNN information being left blank;
default slice information being left blank;
related information for establishing a first data channel;
second indication information;
third indication information;
address-related information of a first server; and
address-related information of the second authentication server.

The first server is a server capable of configuring the credential related to the first network.

The first terminal routing policy is used for accessing the first server or a credential download application.

The first data channel is a data channel in the first network.

The second indication information is used to indicate at least one of the following:
the first data channel is used for interaction between the first communications device and the first server;
the first data channel is used by the first communications device to request the credential related to the first network; and
the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

When the communications device 1600 acts as the second communications device in the foregoing method embodiment, the following steps are implemented when the computer program 16011 is executed by the processor 1602:
obtaining at least one of first information, first indication information, a legitimate device list, and third information; and
performing a first operation based on at least one of the first information, the first indication information, the legitimate device list, and the third information.

The first information includes at least one of the following: index information of a second authentication server, vendor-related information of a first communications device, and address-related information of the second authentication server.

The first indication information is used for requesting to obtain a credential related to a first network, or used to indicate that an access type is a restricted service.

The third information includes at least one of the following:
mapping information between the index information of the second authentication server and the address-related information of the second authentication server; and
the address-related information of the second authentication server.

Optionally, the first operation includes at least one of the following:
determining the second authentication server;
determining to request the second authentication server to perform authentication on the first communications device;
requesting the second authentication server to perform authentication on the first communications device;
requesting a first server to perform authentication on the first communications device;
sending the first information to the first server;
determining whether the first communications device is a legitimate device in the first network;
determining whether configuring, for the first communications device, the credential related to the first network is allowed; and
determining whether accepting a registration request of the first communications device by the first network is allowed.

The first server is a server capable of configuring, for the first communications device, the credential related to the first network.

Optionally, the step of determining the second authentication server includes but is not limited to at least one of the following:
determining the second authentication server based on the index information of the second authentication server in the first information and the mapping information between the index information of the second authentication server and the address-related information of the second authentication server in the third information;
determining the second authentication server based on the vendor-related information of the first communications device in the first information and the mapping information between the index information of the second authentication server and the address-related information of the second authentication server in the third information;
determining the second authentication server based on the address-related information of the second authentication server in the first information and/or the address-related information of the second authentication server in the third information; and
determining the second authentication server based on the first indication information and/or the address-related information of the second authentication server in the third information;
and/or,
the step of determining to request the second authentication server to perform authentication on the first communications device includes but is not limited to at least one of the following:
determining, based on the first indication information and/or the first information, to request the second authentication server to perform authentication on the first communications device; and
determining, based on the first indication information and/or the address-related information of the second authentication server in the third information, to request the second authentication server to perform authentication on the first communications device.

Optionally, in a case that the first communications device satisfies a second condition, the first communications device is determined to be a legitimate device in the first network.

The second condition includes at least one of the following:
the first communications device is authenticated successfully by the second authentication server; and
the first communications device is a communications device in the legitimate device list.

Optionally, the legitimate device list includes at least one of the following:
- a legitimate communications device, not yet configured with a credential related to the first network, in the first network; and
- a communications device for which configuring a credential related to the first network is allowed.

Optionally, before the step of obtaining the first information, when the computer program 16011 is executed by the processor 1602, the following steps are further implemented:
- receiving an access request and/or first indication information from the first communications device; where the first indication information is used for requesting to obtain the credential related to the first network, or used to indicate that the access type is a restricted service; and
- sending request information for the first information based on the access request and/or the first indication information.

Optionally, the request information for the first information includes at least one of the following:
- first request information, where the first request information is used to request vendor information of the first communications device;
- second request information, where the second request information is used to request index information of the second authentication server; and
- third request information, where the third request information is used to request address-related information of the second authentication server.

Optionally, when the computer program 16011 is executed by the processor 1602, the following steps are further implemented:
- in a case that the first communications device is determined to be a legitimate device in the first network, sending second information, where the second information includes at least one of the following:
- related information for establishing a first data channel;
- second indication information; and
- address-related information of a first server.

The first server is a server capable of configuring the credential related to the first network.

The first data channel is a data channel in the first network.

The second indication information is used to indicate at least one of the following:
- the first data channel is used for interaction between the first communications device and the first server;
- the first data channel is used by the first communications device to request the credential related to the first network; and
- the first data channel is used for configuring, for the first communications device, the credential related to the first network.

When the communications device 1600 acts as the third communications device in the foregoing method embodiment, the following steps are implemented when the computer program 16011 is executed by the processor 1602:
- determining third information; and
- sending the third information.

The third information includes at least one of the following:
- mapping information between index information of a second authentication server and address-related information of the second authentication server; and
- the address-related information of the second authentication server.

Optionally, the sending information related to the second authentication server includes:
- in a case that a third condition is satisfied, sending the information related to the second authentication server; where the third condition includes at least one of the following:
- mutual authentication between the third communications device and the second authentication server is successful; and
- mutual authentication between the third communications device and a first network is successful.

When the communications device 1600 acts as the fourth communications device in the foregoing method embodiment, the following steps are implemented when the computer program 16011 is executed by the processor 1602:
- obtaining second information; and
- performing a second operation based on the second information.

The second information includes at least one of the following:
- a first terminal routing policy;
- default DNN information being left blank;
- default slice information being left blank;
- related information for establishing a first data channel;
- second indication information;
- third indication information;
- address-related information of a first server; and
- address-related information of the second authentication server.

The first server is a server capable of configuring the credential related to the first network.

The first terminal routing policy is used for accessing the first server or a credential download application.

The first data channel is a data channel in the first network.

The second indication information is used to indicate at least one of the following:
- the first data channel is used for interaction between the first communications device and the first server;
- the first data channel is used by the first communications device to request the credential related to the first network; and
- the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

Optionally, the second operation includes at least one of the following:
- establishing a first data channel, where the first data channel satisfies at least one of the following: the first data channel is used for interaction between the first communications device and the first server; the first data channel is used by the first communications device to request a credential related to the first network; and the first data channel is used for configuring, for the first communications device, the credential related to the first network;
- requesting the first server to configure the credential related to the first network;
- requesting the second authentication server to configure the credential related to the first network;

declining an access request or a data sending request for a target not being the first server and/or a credential download application at an application layer; and allowing an access request or a data sending request only for a target being the first server and/or the credential download application.

When the communications device 1600 acts as the fifth communications device in the foregoing method embodiment, the following steps are implemented when the computer program 16011 is executed by the processor 1602:

sending second information, where the second information includes at least one of the following:
a first terminal routing policy;
default DNN information being left blank;
default slice information being left blank;
related information for establishing a first data channel;
second indication information;
third indication information;
address-related information of a first server; and
address-related information of the second authentication server.

The first server is a server capable of configuring the credential related to the first network.

The first terminal routing policy is used for accessing the first server or a credential download application.

The first data channel is a data channel in the first network.

The second indication information is used to indicate at least one of the following:
the first data channel is used for interaction between the first communications device and the first server;
the first data channel is used by the first communications device to request the credential related to the first network; and
the first data channel is used for configuring, for the first communications device, the credential related to the first network.

The third indication information is used to indicate at least one of the following: only a restricted service being allowed, only control plane being allowed while user plane being prohibited, only access to the first server being allowed, and only a credential download application being allowed.

Optionally, in a case that a fourth condition is satisfied, an operation related to determining of the second information is performed and/or the second information is sent.

The fourth condition includes:
a terminal accesses a restricted service of the first network or receives first indication information sent by the terminal;
it is determined that the terminal has passed initial authentication, or it is determined that the terminal has been authenticated successfully by the second authentication server;
it is determined that the first communications device is a non-counterfeit device;
it is determined that the terminal is a legitimate device in the first network or that the terminal is a communications device in a legitimate device list; and
it is determined that configuring, for the terminal, a credential related to the first network is allowed.

The communications device 1600 is capable of implementing the processes implemented by the communications device in the foregoing method embodiments. To avoid repetition, details are not described herein again.

An embodiment of the present invention further provides a computer-readable storage medium, where a computer program is stored in the computer-readable storage medium.

When the computer program is executed by a processor, processes of any one of the foregoing access control method embodiments can be implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art, may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

Some embodiments of the present invention have been described with reference to the attached drawings; however, the present invention is not limited to the aforesaid embodiments, and these embodiments are merely illustrative but are not intended to limit the present invention. Persons of ordinary skill in the art may further derive many other implementations according to the teachings of the present invention and within the scope defined in the claims, and all of the implementations shall fall within the scope of the present invention.

What is claimed is:

1. An access control method, performed by a first communications device and comprising:
sending, by the first communication device, first information and/or first indication information to a second communication device, wherein the first information comprises at least one of the following:
index information of a second authentication server;
vendor-related information of the first communications device; or
address-related information of the second authentication server; and
the first indication information is used for requesting to obtain a credential related to a first network, or used to indicate that an access type is a restricted service;
wherein the first communication device comprises a terminal;
the second communication device comprises a communication device in the first network;
wherein the method further comprises: obtaining second information from the second communication device, wherein the second information comprises address-related information of a first server,
wherein the first server is a server capable of configuring the credential related to the first network;
the method further comprising:
performing a second operation based on the second information;
wherein the second operation includes at least one of the following:
establishing a first data channel, wherein the first data channel satisfies at least one of the following: the first data channel is used for interaction between the first communications device and the first server; the first data channel is used by the first communications device to request a credential related to the first network; or the first data channel is used for configuring, for the first communications device, the credential related to the first network; or,
requesting the first server to configure the credential related to the first network.

2. The method according to claim 1, wherein the sending first information comprises:
in a case that a first condition is satisfied, sending the first information; wherein
the first condition comprises at least one of the following:
the first communications device has a second credential;
the first communications device has no credential related to the first network;
the first communications device requests to access the first network;
the first communications device requests to access a restricted service of the first network;
the first communications device requests to obtain a credential related to the first network;
at least one piece of the first information has been obtained;
request information for the first information has been obtained;
information that the first network supports the restricted service has been obtained;
information that the first network supports and/or requests authentication for the restricted service has been obtained;
information that the first network supports and/or requests authentication on the first communications device has been obtained; or
information that the first network supports configuring, for the first communications device, the credential related to the first network has been obtained.

3. The method according to claim 2, wherein the request information for the first information comprises at least one of the following:
first request information, wherein the first request information is used to request vendor information of the first communications device;
second request information, wherein the second request information is used to request index information of the second authentication server; or
third request information, wherein the third request information is used to request address-related information of the second authentication server.

4. The method according to claim 2, wherein the second credential includes at least one of the following:
the credential unrelated to the first network;
the credential for accessing the first network in a case that the terminal has no credential related to the first network;
the credential for accessing the first network in a case that the terminal requests for configuration of the credential related to the first network;
the credential for accessing the restricted service of the first network;
the credential configured for the first communications device by a vendor of the first communications device; and
the credential that can be authenticated by the second authentication server.

5. The method according to claim 1, wherein before the step of sending first information, the method further comprises:
sending an access request and/or sending the first indication information to the second communication device; wherein
the first indication information is used for requesting to obtain the credential related to the first network, or used to indicate that the access type is a restricted service.

6. The method according to claim 1, wherein the restricted service comprises at least one of the following:
only access to the first server being allowed;
only a credential download application being allowed.

7. The method according to claim 1, wherein the second authentication server comprises an authentication server outside the first network.

8. The method according to claim 1, further comprising:
obtaining the credential related to the first network to access the first network.

9. The method according to claim 8, wherein the credential related to the first network comprises a credential for accessing the first network or a credential that can be directly authenticated by an authentication server of the first network.

10. The method according to claim 1, wherein the first network comprises standalone non-public network (SNPN).

11. An access control method, performed by a second communications device and comprising:
obtaining, by the second communication device, at least one of first information, first indication information, a legitimate device list, or third information; and
wherein the first information comprises at least one of the following: index information of a second authentication server, vendor-related information of a first communications device, or address-related information of the second authentication server;
the first indication information is used for requesting to obtain a credential related to a first network, or used to indicate that an access type is a restricted service; and
the third information comprises at least one of the following:
mapping information between the index information of the second authentication server and the address-related information of the second authentication server; or
the address-related information of the second authentication server;
wherein the second communication device comprises a communication device in the first network;
wherein the method further comprises: sending second information,
wherein the second information comprises at least one of the following:
address-related information of a first server; or
second indication information;
wherein the first server is a server capable of configuring the credential related to the first network;

wherein the second indication information is used to indicate at least one of the following:

the first data channel is used for interaction between the first communications device and the first server;

the first data channel is used by the first communications device to request the credential related to the first network; or the first data channel is used for configuring, for the first communications device, the credential related to the first network.

12. The method according to claim 11, further comprising:

performing, by the second communication device, a first operation based on at least one of the first information, the first indication information, the legitimate device list, or the third information;

wherein the first operation comprises at least one of the following:

determining the second authentication server;

determining to request the second authentication server to perform authentication on the first communications device;

requesting the second authentication server to perform authentication on the first communications device;

requesting a first server to perform authentication on the first communications device;

sending the first information to the first server;

determining whether the first communications device is a legitimate device in the first network;

determining whether configuring, for the first communications device, the credential related to the first network is allowed; or determining whether accepting a registration request of the first communications device by the first network is allowed; wherein the first server is a server capable of configuring, for the first communications device, the credential related to the first network.

13. The method according to claim 12, wherein the step of determining the second authentication server comprises at least one of the following:

determining the second authentication server based on the index information of the second authentication server in the first information and the mapping information between the index information of the second authentication server and the address-related information of the second authentication server in the third information;

determining the second authentication server based on the vendor-related information of the first communications device in the first information and the mapping information between the index information of the second authentication server and the address-related information of the second authentication server in the third information;

determining the second authentication server based on the address-related information of the second authentication server in the first information and/or the address-related information of the second authentication server in the third information; or determining the second authentication server based on the first indication information and/or the address-related information of the second authentication server in the third information;

and/or, the step of determining to request the second authentication server to perform authentication on the first communications device comprises but is not limited to at least one of the following:

determining, based on the first indication information and/or the first information, to request the second authentication server to perform authentication on the first communications device; or determining, based on the first indication information and/or the address-related information of the second authentication server in the third information, to request the second authentication server to perform authentication on the first communications device.

14. The method according to claim 11, wherein the second information further comprises:

related information for establishing a first data channel;

the first data channel is a data channel in the first network.

15. The method according to claim 11, wherein the sending second information comprises:

in a case that the first communication device is determined to be a legitimate device in the first network, sending second information.

16. The method according to claim 11, further comprising:

obtaining the credential related to the first network to access the first network.

17. The method according to claim 16, wherein the credential related to the first network comprises a credential for accessing the first network or a credential that can be directly authenticated by an authentication server of the first network.

18. An access control method, performed by a fourth communications device and comprising:

obtaining second information; and performing a second operation based on the second information; wherein the second information comprises at least one of the following:

a first terminal routing policy;

default DNN information being left blank;

default slice information being left blank;

related information for establishing a first data channel;

second indication information;

third indication information;

address-related information of a first server; or address-related information of a second authentication server; wherein the first server is a server capable of configuring a credential related to a first network;

the first terminal routing policy is used for accessing the first server or a credential download application;

the first data channel is a data channel in the first network;

the second indication information is used to indicate at least one of the following:

the first data channel is used for interaction between a first communications device and the first server, the first data channel is used by the first communications device to request the credential related to the first network; or the first data channel is used for configuring, for the first communications device, the credential related to the first network; and the third indication information is used to indicate at least one of the following: only a restricted service being allowed, only control plane being allowed while user plane being prohibited, only access to the first server being allowed, or only a credential download application being allowed wherein the fourth communication device comprises a terminal;

wherein the second operation comprises at least one of the following:

establishing a first data channel, wherein the first data channel satisfies at least one of the following: the first data channel is used for interaction between the first communications device and the first server; the first data channel is used by the first communications device to request a credential related to the first network; or the first data channel is used for configuring, for the first communications device, the credential related to the first network; or requesting the first server to configure the credential related to the first network.

19. The method according to claim 18, wherein the second operation further comprises at least one of the following:

requesting the second authentication server to configure the credential related to the first network;

declining an access request or a data sending request for a target not being the first server and/or a credential download application at an application layer; or allowing an access request or a data sending request only for a target being the first server and/or the credential download application.

* * * * *